(12) United States Patent
Cowan et al.

(10) Patent No.: US 12,445,475 B1
(45) Date of Patent: Oct. 14, 2025

(54) MANAGING UNMANAGEABLE DEVICES ON AN ENTERPRISE NETWORK

(71) Applicant: Tanium Inc., Emeryville, CA (US)

(72) Inventors: Crispin Cowan, Fall City, WA (US); James D. Hegge, Battleground, WA (US)

(73) Assignee: Tanium Inc., Emeryville, CA (US)

( * ) Notice: Subject to any disclaimer, the term of this patent is extended or adjusted under 35 U.S.C. 154(b) by 216 days.

(21) Appl. No.: 18/365,208

(22) Filed: Aug. 3, 2023

(51) Int. Cl.
 *H04L 9/40* (2022.01)
(52) U.S. Cl.
 CPC ................................ *H04L 63/1425* (2013.01)
(58) Field of Classification Search
 CPC ......... H04L 41/12; H04L 63/10; H04L 63/20; H04L 63/1425
 See application file for complete search history.

(56) References Cited

U.S. PATENT DOCUMENTS

| | | | |
|---|---|---|---|
| 8,086,729 B1 | 12/2011 | Hindawi et al. | |
| 10,485,536 B2 | 11/2019 | Ming et al. | |
| 10,853,501 B2 | 12/2020 | Brannon | |
| 11,172,470 B1 | 11/2021 | Guieu et al. | |
| 11,258,654 B1 | 2/2022 | Hindawi et al. | |
| 11,343,355 B1 | 5/2022 | Goela et al. | |
| 2012/0076052 A1* | 3/2012 | Kling | H04L 45/64 370/255 |
| 2019/0312775 A1* | 10/2019 | Patil | H04L 41/0806 |
| 2019/0347430 A1* | 11/2019 | Huneycutt | G06F 21/44 |
| 2020/0090197 A1 | 3/2020 | Rodriguez et al. | |
| 2022/0021585 A1* | 1/2022 | Barton | H04L 47/125 |
| 2022/0261321 A1* | 8/2022 | Zakharkin | G06F 11/1451 |
| 2023/0026782 A1* | 1/2023 | Sha | H04L 67/10 |
| 2023/0029656 A1* | 2/2023 | Anderson | H04L 43/08 |
| 2024/0152372 A1* | 5/2024 | Elshafey | G06F 9/45558 |

(Continued)

FOREIGN PATENT DOCUMENTS

| | | |
|---|---|---|
| WO | 2021055268 A1 | 3/2021 |
| WO | 2022254420 A1 | 12/2022 |

OTHER PUBLICATIONS

Pennino et al., "Efficient Certification of Endpoint Control on Blockchain," IEEE Access Year: 2021 | vol. 9 | Journal Article | Publisher: IEEE.*

(Continued)

*Primary Examiner* — Roderick Tolentino
(74) *Attorney, Agent, or Firm* — Nicholson De Vos Webster & Elliott LLP

(57) ABSTRACT

Systems, methods, and machine-readable media are described for managing unmanageable devices in an enterprise network. In particular, techniques are described for allowing normally unmanageable endpoint devices to be managed by a management service. An agent establishes a connection with a management service in accordance with a management protocol. The agent collects endpoint data associated with a plurality of unmanageable endpoint devices and generates a virtual representation of each unmanageable endpoint device using a corresponding portion of the endpoint data. The agent performs transactions with the management service using each virtual representation to represent a corresponding unmanageable endpoint device participating in the management protocol.

22 Claims, 33 Drawing Sheets

(56) References Cited

U.S. PATENT DOCUMENTS

2024/0313949 A1* 9/2024 Yeomans .............. H04L 9/0855
2024/0333600 A1* 10/2024 SethuRamasamy .... H04L 41/16

OTHER PUBLICATIONS

Kuperberg, Michael, "Blockchain-Based Identity Management: A Survey From the Enterprise and Ecosystem Perspective," IEEE Transactions on Engineering Management Year: 2020 | vol. 67, Issue: 4 | Journal Article | Publisher: IEEE.*
"CyberGRX Client Services Datasheet," 2023, 2 pages, CyberGRX.
"CyberGRX Framework Mapper Datasheet," 2023, 2 pages, CyberGRX.
"CyberGRX Ransomware Threat Profile and Ecosystem View," 2023, 1 page, CyberGRX.
"Our world today: increasing IT complexity and vulnerability," 2023, 2 pages, Tanium.
"Predictive Risk Profile," 2023, 4 pages, CyberGRX.
"Tanium™ API Gateway User Guide," Mar. 21, 2023, 356 pages, Version 1.6.32, Tanium.
"Tanium™ Appliance Deployment Guide," Mar. 24, 2023, 264 pages, Version 1.7.5, Tanium.
"Tanium Applicance product brief," 2023, 3 pages, Tanium.
"Tanium Asset," 2023, 2 pages, Tanium.
"Tanium™ Asset User Guide," Jun. 2, 2020, 72 pages, Version 1.9.9, Tanium.
"Tanium™ Direct Connect User Guide," Mar. 20, 2023, 50 pages, Version 2.7.43, Tanium.
"Tanium™ Discover User Guide," Mar. 8, 2023, 113 pages, Version 4.7.159, Tanium.
"Tanium for Asset Discovery and Inventory," 2022, 4 pages, Tanium.
"Tanium Reveal, Locate and Manage Sensitive Data Across Endpoints to Mitigate Exposure," 2021, 3 pages, Tanium.

* cited by examiner

MANAGING UNMANAGEABLE DEVICES ON AN ENTERPRISE NETWORK

TECHNICAL FIELD

One or more embodiments relate to the field of network monitoring and management; and more specifically, to techniques for managing endpoint devices, including endpoint devices which do not support certain types of management software.

BACKGROUND ART

A managed network (e.g., an enterprise network) often includes various types of machines and computing devices (referred to generally as "endpoints" or "endpoint devices") configured to perform a wide variety of functions. In a centrally managed network, a central management service is responsible for issuing requests to the managed endpoints on the network and processing the responses in accordance with a management protocol. For example, the central management service typically aggregates and stores the data from the endpoint responses and analyzes the data to identify potential problems with the individual endpoints and/or the network as a whole (e.g., such as when one or more monitored threshold values have been exceeded). In response to detecting potential or actual problems, the central management service may transmit various forms of notifications to client devices operated by administrators or other users, so that appropriate action can be taken to resolve the problems.

In existing implementations, endpoint management software is installed on endpoint devices so that they can be managed by the central management service. However, there are multiple classes of endpoint devices that are either unwilling or unable to host endpoint management software, and therefore cannot participate in the enterprise management protocol required to communicate with the central management service. These devices are referred to as "unmanaged and unmanageable devices" (UUDs), "unmanageable devices", or "UUD endpoints".

Customers have strong and increasing desires to manage these endpoint devices because, if not properly managed, they can become a security risk to the enterprise. Even low-powered, seemingly innocuous devices can be used by attackers as an entry point into the enterprise network.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

DETAILED DESCRIPTION

Figure 1:
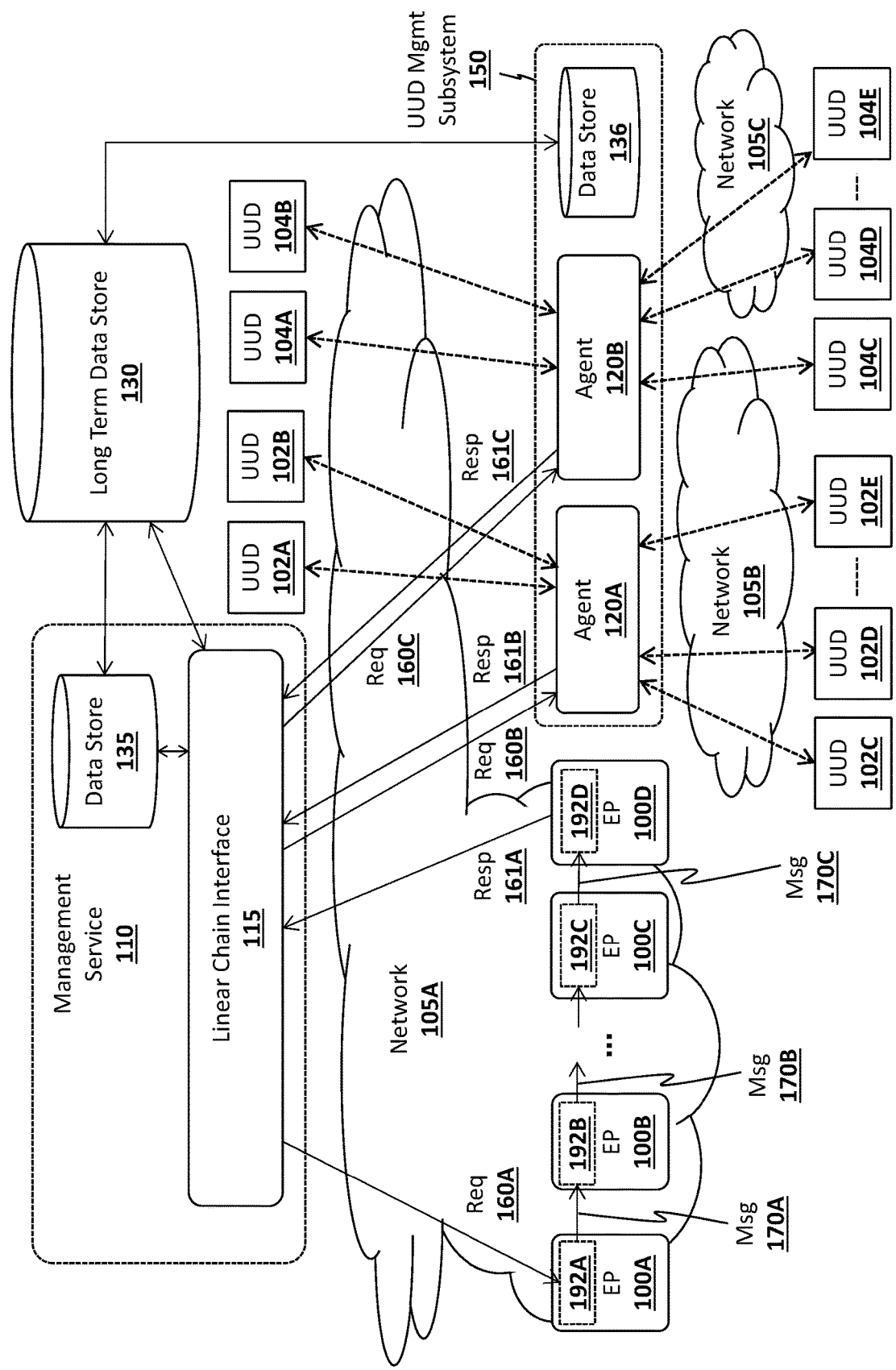
FIG. 1 illustrates one implementation of a management service with a linear chain interface coupled to various types of manageable and unmanageable endpoints.

Embodiments of the invention manage UUD endpoints through a variety of techniques, including the strategic use of management agents which virtualize or otherwise act as proxies for the UUD endpoints. In some implementations, management agents are configured on network nodes to manage multiple "down-stream" UUD endpoints. For example, in some embodiments, the management agents gather data from UUD endpoints (e.g., in accordance with a UUD endpoint protocol or via an API of an external service which supports the UUD endpoints), optionally aggregate the UUD endpoint data, and virtualize the UUD endpoints in management service responses (e.g., mimicking the UUD endpoints so that the management service views the UUD endpoints as participating in the management service protocol).

Because there are several distinct types of UUD endpoints, these embodiments can include several distinct forms of agents that manage and gather data from the UUD endpoints, collectively referred to herein as the "UUD management subsystem". Some examples of agents include:

Web API Agents: Google Chromebooks will not allow a management client, but Google provides a web API that allows registered device owners, such as school districts, to call into the API to harvest data and manage their devices.

Web Managed IoT: Similarly, most IoT platform vendors offer a web-based cloud management interface for their devices. This provides enterprises a conduit to manage IoT devices but leaves them with the problem of having to know how to manage multiple diverse web interfaces for the many brands of IoT devices on the market.

Downstream Connectors: Many other IoT devices are designed to be managed by a "connector" or "controller" device. This may be a full-scale PC that is itself able to host a management client, but its job is to manage many smaller, downstream devices.

API Connectors with other Security/Inventory Tools: Nearly all security tools have their own inventory base which embodiments of the invention translate and normalize into the base of the endpoint management system. By way of example, and not limitation, the IoT device inventory can be translated from Forescout/Armis, etc., or OT inventory from Claroty, Nozomi, etc., and normalized into the data formats/protocols communicated on the endpoint management system. As a result, in some implementations, UUD endpoints will require a gallery of connectors to other tools so that customers can import inventory information from these sources.

In one implementation, the agents of the UUD endpoint subsystem poll their respective UUD endpoints at regular intervals using a protocol supported by the UUD endpoints (potentially a management protocol different from that used by the management service), translate and/or normalize the results, and store the translated/normalized UUD data in a repository, from which it can be provided in response to queries from the endpoint management system. In cases where the "query" includes a command to perform an operation on selected endpoints, then each corresponding UUD agent pushes the action down to the selected endpoints (if supported), translating the command, if necessary, based on the UUD type. Because the UUD endpoints, by definition, do not support the protocols used by the endpoint management system, protocol bridging may be implemented.

Some specific examples of UUD endpoints include, but are not limited to, Internet of Things (IoT) devices, Operational Technology (OT) devices, locked-down thin clients (e.g., Chromebooks), mobile devices (e.g., iPhones, Android devices), and various types of networking devices which will not run management software. This category of endpoints is growing rapidly, in contrast with "traditional" endpoints such as end-user workstations and laptops and on-premises servers.

Chromebooks are becoming increasingly prevalent, especially in the K-12 market, which portends workstation trends for the future when those students graduate. Management clients cannot be installed on Chromebooks, because Chromebook "apps" are never given sufficient permissions on the device.

IoT devices are a rapidly growing sector for both enterprises and consumers. Enterprises, in particular, have many older IoTs deployed in the form of network routers, smart lighting and HVAC management, and medical IoTs running their operations. Most IoT vendors do not support third party management clients and many of these devices do not have the processing resources to host one.

Operational technology (OT) devices are used to monitor and control physical processes, devices, and infrastructure. There are various forms of OT devices including devices which perform monitoring of critical infrastructure (CI) (sometimes referred to as industrial IoT (IIoT) devices) and devices which can also perform control functions such as controlling industrial machines on manufacturing floors and controlling energy generation and distribution systems. OT devices are used in various industries including manufacturing, oil and gas, power generation, aviation, maritime, rail, and utilities, to name a few.

Within cloud services, providers charge by the minute for consuming CPU time and occupying memory, making management clients a material additional expense to host. Thus, many customers will choose to run without a management client in the cloud.

FIG. 1 illustrates one implementation of a management service 110 with a linear chain interface 115 for communicating with a plurality of manageable endpoints 100A-D on which endpoint management software 192A-D is installed. Also illustrated are a plurality of UUD endpoints 102A-E and 104A-E managed through agents 120A and 120B, respectively, within a UUD management subsystem 150. The management service 110 may be configured to operate in a variety of environments including, but not limited to, a server in a cloud-based platform and a server on a private network.

In one embodiment, the linear chain interface 115 supports a "linear chain" or "linear orbit" management protocol which is implemented, at least in part, by the endpoint management software 192A-D running on the manageable endpoints 100A-D, respectively. Because the UUD endpoints 102A-E and 104A-E do not support endpoint management software, they cannot participate directly in the linear chain management protocol. As such, agents 120A and 120B of the UUD management subsystem 150 operate as proxies for the UUD endpoints, translating between the data formats and protocols supported by the UUD endpoints 102A-E, 104A-E and those supported by the linear chin interface 115. Data associated with some types of UUD endpoints can only be accessed through an API provided by the endpoint provider (e.g., such as IoT devices and OT devices). In such cases, the agent is configured to communicate and collect endpoint data via the API. For other types of UUD endpoints, the agent can communicate directly with the endpoint.

There are many variations on the linear chain approach that may be used. Briefly, in a linear chain approach, the various instances of the endpoint management software 192A-D collectively operate to form a linear chain (also referred to as a ring, neighborhood, chain, arc, series, propagation, propagation channel) between the managed endpoints 100A-D. While a single set of managed endpoints 100A-D are illustrated for simplicity, hundreds or thousands of endpoints may be similarly configured with endpoint management software to implement many additional linear chains. Moreover, while only four endpoints 100A-D are shown in FIG. 1, a plurality of additional endpoints may be included in the linear chain (i.e., as indicated by the dotted line between endpoints 100B and 100C). In a linear chain configuration, rather than a management service communicating directly with client software on each managed endpoint 100A-D, a management request 160A directed to a first endpoint 100A, causes a sequentially-updated message 170 to be passed from the first endpoint 100A along a sequence of other endpoints 100B-D in the linear chain, collecting and aggregating data as it passes through each endpoint.

The messages passed between endpoints 100A-D can be viewed as a single message 170 which is updated with additional data at each endpoint 100A-D or separate messages 170A-C transmitted from each endpoint and updated with the data from all previous messages. In either case, once all requested data has been collected from the endpoints 100A-D, the last endpoint 100D in the chain transmits the response message 161A to the management interface, containing the requested data (e.g., in an aggregated and/or compressed format) from all endpoints in the chain.

In addition to the techniques described here, a linear chain may also be implemented as described in: application Ser. No. 16/854,844, issued as U.S. Pat. No. 11,172,470, and titled System, Security and Network Management Using Self-Organizing Communication Chains in Distributed Networks; application Ser. No. 15/686,054, issued as U.S. Pat. No. 10,485,536, and titled Fast Detection and Remediation of Unmanaged Assets; application Ser. No. 16/917,800, issued as U.S. Pat. No. 11,258,654, and titled Parallel Distributed Network Management; and application Ser. No. 16/943,291, issued as U.S. Pat. No. 11,343,355, titled Automated Mapping of Multi-Tier Applications in a Distributed System, all of which are assigned to the assignee of the present application.

One implementation of the management service 115 maintains a short term data store 135 to store the data collected from the various endpoints and a long term data store 130 such as a database or other persistent storage device. The short term data store 135 may be an in-memory data store (e.g., an in-memory cache) containing a subset of the endpoint data, such as the most recently collected, most recently used, or most relevant endpoint data, which can be accessed from memory or cache at relatively low latency and high throughput. The long term store 130 stores all endpoint data (e.g., collected over a relevant period of time) or a filtered subset of the endpoint data (e.g., with redundancies removed to improve storage efficiency). The management service 110 or other authorized software may read any endpoint data from the long term data store 130 when needed (e.g., for analysis or viewing). Once read, the data may be temporarily cached in the short term data store 135 (e.g., in accordance with a data management policy such as a least-recently used or most frequently used policy, which keeps the most recently or most frequently used data in the short term data store 135).

Similarly, data retrieved from the UUD endpoints 102A-E, 104A-E by the UUD management subsystem 150 may be temporarily stored in a local data store 136 which may be an in-memory data structure for storing the current state of each of the UUD endpoints 102A-E, 104A-E. The agents 120A-B can use this data structure to virtualize or act as a proxy for the various UUD endpoints when communicating with the linear chain interface 115. In some implementations (described in greater detail below), the local data store 136 comprises an in-memory table or other data structure, with each row associated with a different UUD endpoint 102A-E, 104A-E, allowing the agents 120A-B to scan through the rows of the table to implement a virtual linear chain.

In some implementations, the management service 110 is a Cloud-based service which provides endpoint management for endpoints distributed across various interconnected networks 105A-C. In some implementations described here, the networks 105A-C and associated endpoints are all associated with a particular organization (e.g., the networks 105A-C are subsets of a distributed enterprise network) which uses the management functions provided by the management service 110 to manage endpoints connected to its networks 105A-C. In some implementations, the management functionality provided by the management service 110 may be used by multiple different organizations to manage endpoints on multiple corresponding enterprise networks. In such cases, the visibility of the various networks and associated endpoints is limited based on the organization (e.g., administrators associated with a particular organization will only have access to the networks and endpoints associated with the organization).

The linear chain interface 115 may transmit different types of request messages 160A for endpoint data from different endpoints, e.g., requesting specific types of data from specific endpoints and/or requesting the same set of data from each endpoint in each chain. The request message 160A can be a query message causing the management software 192A-D on each managed endpoint 100A-D to perform a separate query to collect local data, which is then accumulated with data from previous endpoints in the chain and passed in a message to the next endpoint in the chain.

The management software 192A-D can be implemented such that the sequence of managed endpoints 100A-D in the linear chain is self-forming. For example, the management software 192A-D may implement a discovery protocol to identify all other instances of the management software 192A-D running within the network 105A or within a particular subnetwork of the network 105A (e.g., within a network "neighborhood" defined based on assigned network addresses). Once identified, the different instances of the management software 192A-D communicate to determine the order of managed endpoints 100A-D in the linear chain. The management software 192A-D can also dynamically adjust to incorporate new managed endpoints into the chain (e.g., when a new endpoint is added to the network 105A or a subnetwork thereof) and when existing endpoints are removed from the chain (e.g., any of managed endpoints 100A-D). When a new linear chain is established and/or when an existing linear chain is changed, one of the managed endpoints 100A-D may transmit a message to the linear chain interface 115 to confirm the current set of managed endpoints included in the linear chain.

In some implementations, the linear chain is configured with a "head", "front-end", or "forward leader" endpoint, such as endpoint 100A, and a "tail", "back-end", or "backward leader" endpoint, such as endpoint 100D. The request message 160A is sent to the front-end endpoint 100A and, responsive to the message, the front-end endpoint 100A performs a local scan and adds data to the message 170 in accordance with the request message 160A. At this stage, the collected data only includes data from the front-end endpoint 100A. The message 170A is then forwarded to the next endpoint 100B in the sequence, which may perform the requested operations to add data to the message 170B; as such, the message 170 accumulates data from each endpoint 100A-D as it is sent along the linear chain until it arrives at the back end endpoint 100D which performs the requested operations, accumulates the data and transmits the response message 161A back to the linear chain interface 115 with the data from all endpoints 100A-D in the chain. Consequently, each of the managed endpoints 100A-D receiving a message 170 from its upstream neighbor acts upon the message by providing an update to the message based on its local state, performing some aggregation of the information in the message (e.g., by adding to or modifying aggregated results already included in the message as received from its upstream neighbor), and/or forwarding the message to its downstream neighbor along the linear chain (or to the linear chain interface 115 as a response 160B if it is the back-end endpoint 100D). Thus, there is a respective communication channel formed (e.g., a packet-based channel) between each pair of the endpoints 160A-D in the sequence. In some implementations, a similar sequential approach is used, but the back-end endpoint 100D sends the response message 160B back to the front-end endpoint 100A, which forwards the response message 160B back to the management interface.

While in some embodiments the messages indicate both the checks to be performed on respective endpoints 100A-D (e.g., particular operations to generate result data, specific persistent or previously-collected data, etc) and the data to be included in the response, other embodiments operate differently. For example, different checks may be indicated in different messages (e.g., each check in a separate message, subsets of the checks in the assessment into different messages). As another orthogonal example, some embodiments use message(s) to distribute the checks (sometimes referred to as check messages, assessment messages, distribution messages, question messages, or query messages) and subsequent messages to collect the responses (referred to as response messages, collection messages, answer collection messages, or report messages). These response message may traverse the linear chain of endpoints 100A-D in the same or opposite direction as the check messages (e.g., the software 192A-D may be configured to forward messages differently based on the message type).

In some embodiments, while queries are passed from electronic device to electronic device along a linear communication chain, individual queries can be directed to or targeted to a subset of the endpoints 100A-D in the linear communication chain, so that only a specified subset of the electronic devices in the linear chain process and update the message with requested data.

In some embodiments, the self-forming aspect of the linear chain may be implemented via: 1) an endpoint that acts as a server and that facilitates the creation and maintenance of one or more of the linear chains (e.g., an elected one of the managed endpoints 100A-D); and/or 2) the management software 192A-D on each of the endpoints 100A-D, respectively, executes a process based on a set of predetermined organization rules that causes each endpoint to find its immediate neighbors and coordinate with these immediate neighbors to self-organize into a linear chain. In this implementation, the "immediate" neighbors may be based on the network addresses assigned to each endpoint device 100A-D. For example, in a numerical addressing scheme such as TCP/IP, the "immediate" neighbors of an endpoint may be the endpoints with network addresses numerically closest to the endpoint's network address (e.g., the nearest neighbors of 192.168.0.4 being 192.168.0.5 and 192.168.0.3). As mentioned, the linear chain may grow or shrink as endpoints join and leave network 105A through the independent local actions of the endpoints themselves. When a nearest neighbor of an endpoint leaves the network, the endpoint updates its linear chain connection information to route messages to a new nearest neighbor.

Figure 2:
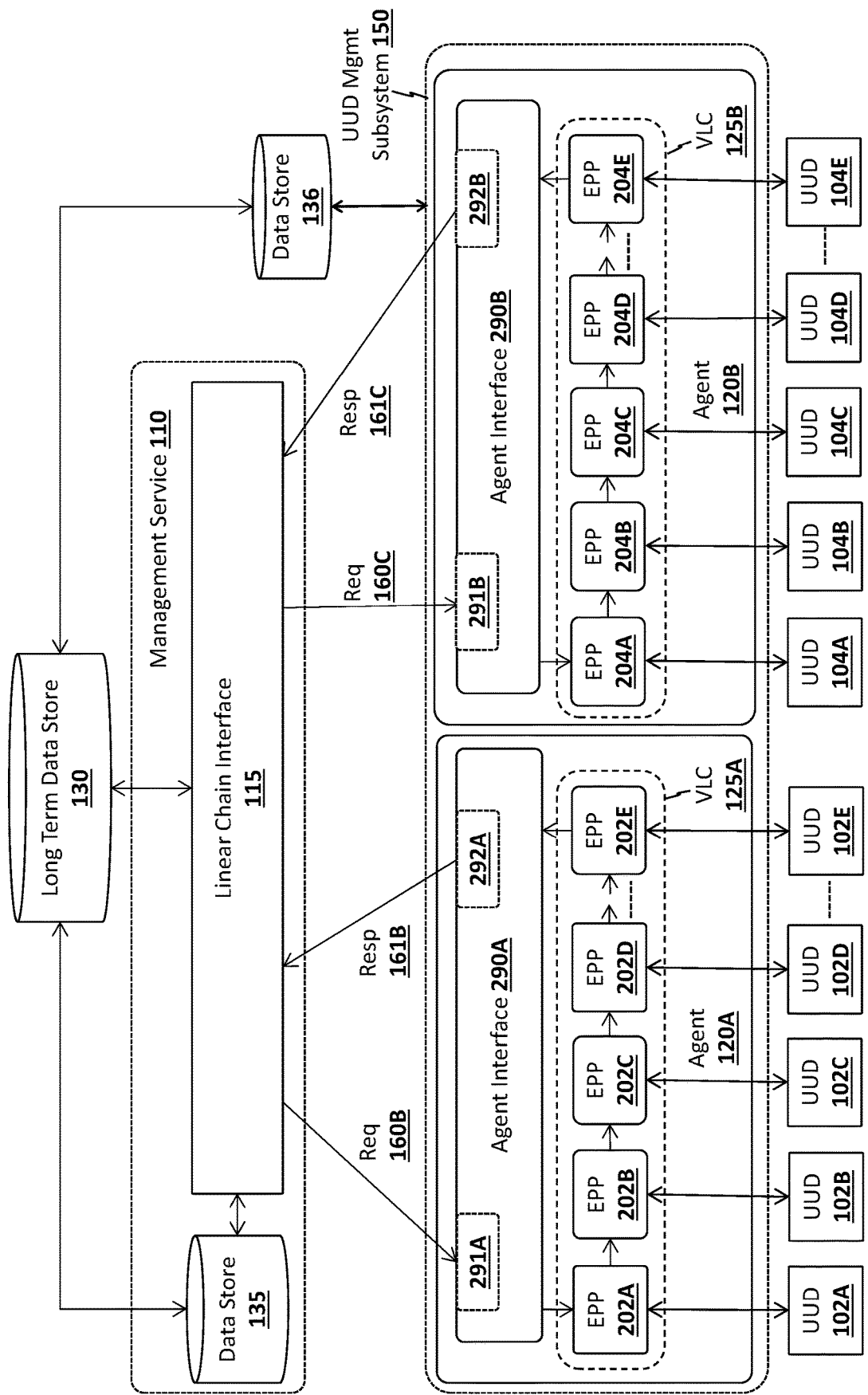
FIG. 2 illustrates agents using virtual linear chains (VLCs) to connect unmanageable devices (UUD endpoints) to a management service.

FIG. 2 illustrates an implementation in which agents 120A and 120B represent corresponding sets of UUD endpoints 102A-102E and 104A-104E, respectively, in virtual linear chains 125A and 125B, respectively. Different agents may be used to represent different types of UUD endpoints. For example, UUD endpoints 102A-E may be IoT devices represented in a first VLC 125A by agent 120A and UUD endpoints 104A-E may be Chromebooks or OT devices, represented in a second VLC 125B by agent 120B.

In the illustrated implementation, within the virtual linear chain 125A, each UUD endpoint 102A-E is represented by a respective endpoint proxy (EPP) data structure 202A-E. Similarly, within virtual linear chain 125B, each UUD endpoint 104A-E is represented by a respective EPP data structure 204A-E. In this implementation, the EPP data structures 202A-E, 204A-E provide a virtualized representation of the state of each of the corresponding sets of UUD endpoints 102A-E, 104A-E, with each EPP data structure storing data received from its corresponding UUD endpoint. For example, each EPP data structure 202A-E, 204A-E may store a subset of data associated with a relevant state of each corresponding UUD endpoint 102A-E, 104A-E, respectively, which is used for responding to linear chain requests 160B-C initiated by the linear chain interface 115. In some implementations, each EPP data structure comprises a separate virtual machine representing its corresponding UUD endpoint. While only two agents 120A-B are shown for the purpose of explanation, any number of agents may be used for managing a number of different types of UUD endpoints.

Various types of data structures may be used to implement the EPPs 202A-E, 204A-E, including sets of key-value pairs, linked lists, stacks, trees, heaps, directed/undirected graphs, relational databases, and tables. As described below, for example, with respect to FIG. 3, one embodiment uses a table data structure with each row associated with one of the UUD endpoints and each column associated with particular data types provided from the UUD endpoints.

Regardless of the type of data structure used to implement the EPPs 202A-E, 204A-E, the data stored in the data structure may be updated periodically via communication with the corresponding UUD endpoints 102A-E, 104A-E (e.g., once every hour, minute, second, etc), respectively, by the corresponding agents 120A-B. Alternatively, or additionally, the agents 120A-B may query their corresponding UUD endpoints dynamically, in response to requests 160B-C from the linear chain interface 115. In one implementation, the agents 120A-B perform dynamic queries in response to requests 160B-C, but only to retrieve UUD data which has changed relative to the data stored in the endpoint proxies 202A-E, 204A-E (e.g., since the last time data was retrieved).

In one embodiment, agent interfaces 290A-B process the requests 160B-C from the linear chain interface 115 and transmit the corresponding responses 161B-C. To mimic a linear chain implementation, some implementations of the agent interfaces 290A-B use two different network addresses—the first 291A-B to receive requests as the front-end endpoint and the second 292A-B to transmit responses as the back-end endpoint. For example, in FIG. 2, agent interface 290A may expose a particular network port 291A with a first network address to mimic the front-end endpoint in the linear chain which receives the request 160B and may use a second network port 291B with a second network address to mimic the back-end endpoint which transmits the response 161B. Similarly, agent interface 290B uses a port 291B with a first network address to receive incoming requests 160C and another port 292B with a second network address to transmit responses 161C. Using different network addresses for receiving requests and transmitting responses allows the agents 120A-B to transparently represent each set of UUD endpoints 102A-E, 104A-E without changes to the linear chain interface 115. Using these techniques the linear chain interface 115 views the UUD endpoints 102A-E, 104A-E as any other managed endpoints.

In some implementations, the network addresses and ports 291A-B, 292A-B, 291B, 292B are IP addresses and TCP ports (i.e., for communicating over TCP/IP networks). However, the underlying principles of the invention are not limited to any particular network addressing protocol.

The virtual linear chains 125A-B described above may be implemented by agents 120A-B operating on a single electronic device (e.g., a single endpoint device coupled to the network) and/or may be distributed across multiple electronic devices.

Figure 3:
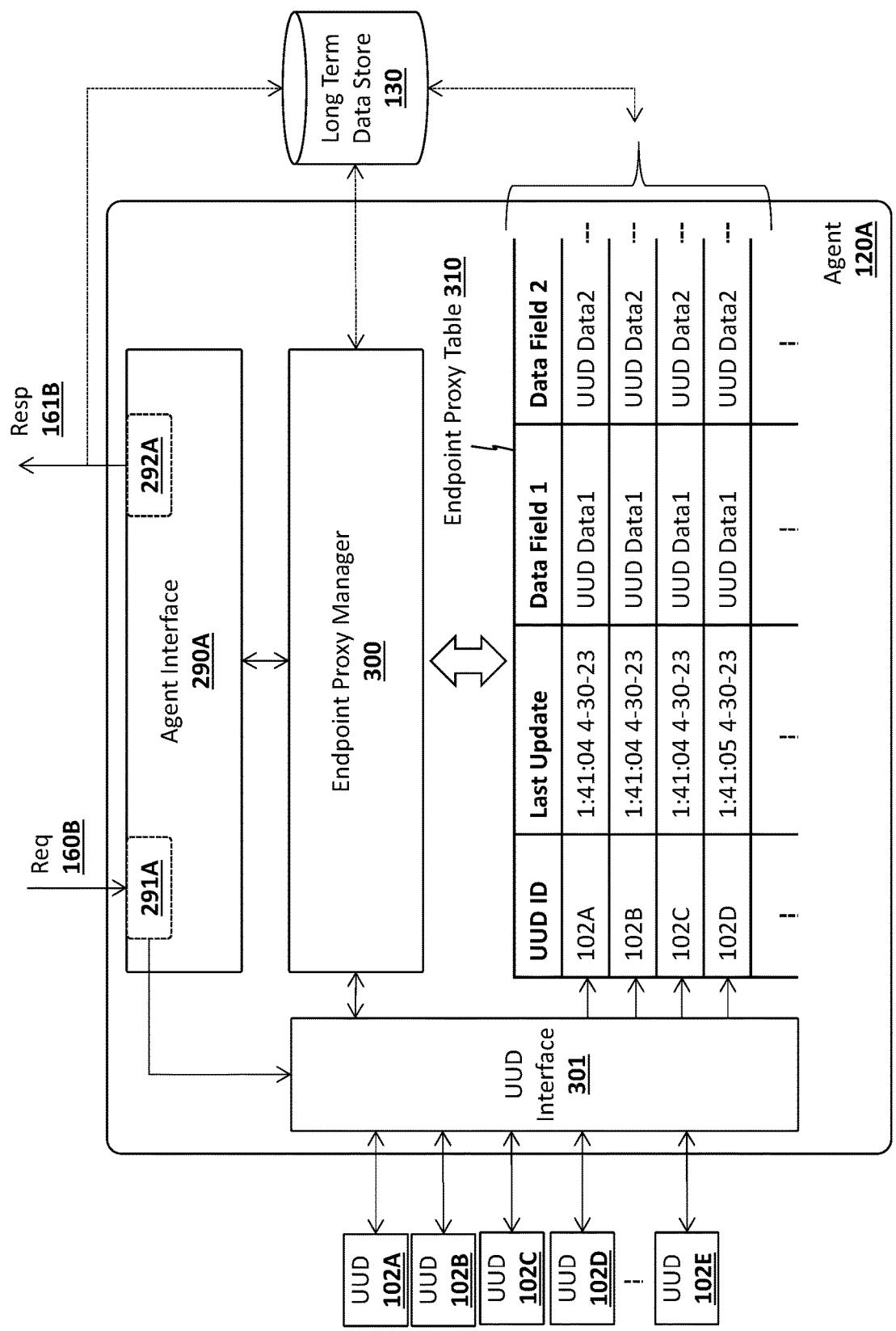
FIG. 3 illustrates one embodiment of an agent, including an endpoint proxy manager and a UUD interface.

FIG. 3 illustrates one particular implementation of an agent 120A including an endpoint proxy manager 300 for storing and managing data retrieved from a set of UUD endpoints 102A-E via a UUD interface 301. In this embodiment, the UUD interface 301 communicates with the UUD endpoints 102A-E in accordance with a UUD endpoint supported communication protocol and data format to retrieve the relevant data and associated state information (e.g., periodically and/or in response to requests received via the agent interface 290A). In some cases, the only way to communicate with the UUD endpoints 102A-E is through an API exposed by the cloud service in which the UUD endpoints are registered (e.g., an IoT cloud service for IoT devices, an OT cloud service for OT devices, a Google cloud service for Chromebooks, etc). Thus, the UUD interface 301 communicates with the cloud service API exposed by the relevant cloud service to communicate with the UUD endpoints 102A-E.

In one implementation, the UUD data is stored in an endpoint proxy table 310 comprising a plurality of rows corresponding to the plurality of UUD endpoints 102A-E (e.g., with each row storing data for one UUD). The endpoint proxy table 310 may be stored as an in-memory data structure and backed by persistent storage (e.g., long term data store 130). The columns of the endpoint proxy table 310 indicate specific types of data/state information stored for each UUD, which can include any type of data or state information collected in a request message as it is passed between endpoints in a linear chain. A "last update" column is shown which indicates the last time the data in the corresponding row was updated and may be used by the endpoint proxy manager 300 to determine whether newer data needs to be requested via the UUD interface 301. A plurality of additional columns correspond to various additional UUD data requested by the linear chain interface 115.

In one implementation, the agent interface 290A (and/or the endpoint proxy manager 300) translate and/or normalize the data format of the UUD data to the data formats supported by the linear chain interface 115. For example, the agents 290A-B of the UUD endpoint subsystem 150 poll their respective UUD endpoints 102A-E, 104A-E at regular intervals and/or dynamically (in response to requests) to retrieve new UUD data. The endpoint proxy manager 300 receives the data from the UUD interface 301 and, if necessary, translates and/or normalizes the data before storing it in the endpoint proxy table 310 (i.e., in this implementation, the table comprises a normalized representation of the UUD data). Alternatively, or in addition, the data may be normalized by the agent interfaces 290A-B when generating the response messages 161A-B, respectively.

Thus, the endpoint proxy table 310 represents the state of the real endpoints (i.e., the UUD endpoints) and the endpoint proxy manager 300 processes linear chain requests 160B via the table structure, reading and writing state changes as necessary to emulate the operations the UUD endpoints 102A-E would have performed if they were actually participating in the linear chain. In some implementations, the back-end database 130 described above is populated with the UUD endpoint information from the endpoint proxy table 310 and/or directly from the responses 161B provided from the agent interface 290A, providing greater efficiency for servicing queries from the management service 110.

In an implementation in which the endpoint management service 110 only communicates via the linear chain protocol, the agents 120A-B convert between the data formats and protocols of the UUD endpoints 102A-E, 104A-E and the linear chain data formats and protocol. For example, the linear chain requests 160B-C are translated into UUD endpoint protocol requests by the agent interface 290A and/or the UUD interface 301. In addition, the data collected from the UUD endpoints 102A-E, 104A-E is translated and incorporated into linear chain responses 161B-C by the UUD interface 301 and/or linear chain interface 115.

Ultimately, the UUD data is persistently stored within the long term data store 130, via the linear chain interface 115 and/or by the agents 120A-B themselves. In this implementation, the agents 120A-B include an interface to the long term data store 130 for storing UUD endpoint data and accessing UUD endpoint data in response to certain requests 160A. For example, if the data requested for a particular UUD endpoint is not stored locally by the agent 120A (e.g., not stored in the endpoint proxy table 310 or other shorter term storage device) then instead of, or in addition to retrieving the data dynamically from the UUD endpoint, the agent 120A may query the long term data store 130 to retrieve the data, or portions of the data. The decision as to whether to retrieve the data directly from the UUD endpoint or the long term data store 130 may be based on the size of the requested data, the type of data requested (e.g., whether the data is relatively static or changes frequently), the staleness of the data in the long term data store 130, and the current availability of the UUD endpoint.

The requests 160A-B from the linear chain interface 115 may also include commands to perform operations on selected endpoints, including the UUD endpoints 102A-E, 104A-E in addition to the linear chain endpoints 100A-D. Various types of commands may be included in requests such as rebooting the endpoint, terminating or executing certain applications or processes, and performing a scan of local memory or storage device. The management software 192A-D running on the linear chain endpoints 100A-D execute the commands to perform the corresponding operations and communicate the results via linear chain messages passed between endpoints and the final response message 161A. For the UUD endpoints, the agent interface 290A or UUD interface 301 may translate any commands included in the request 160B into commands which can be executed by the UUD endpoints 102A-E (e.g., e.g., based on the operating system executed on the UUD endpoints 102A-E, 104A-E) and/or commands which will retrieve the requested UUD data from an intermediary device (e.g., such as a database of the cloud service which supports the UUD endpoints). In some implementations, a command mapping table or other data structure maps commands supported by the management service 110 and management software 192A-D to corresponding commands supported by software running on the UUD endpoints 102A-E, 104A-E and/or by intermediary devices.

In the embodiments described thus far, the linear chain interface 115 and the management software 192A-D running on endpoints 100A-D implement a linear chain protocol. In some implementations, the endpoint management service 110 includes additional interfaces for establishing connections with endpoints (or intermediary devices), including interfaces for forming direct connections with endpoints and interfaces for communicating with external services. In addition, some implementations can form linear chains using combinations of real endpoints (e.g., EPs 100A-D) and endpoint proxies (e.g., EPPs 202A-E) of virtual linear chains (e.g., VLC 125A).

Figure 4:
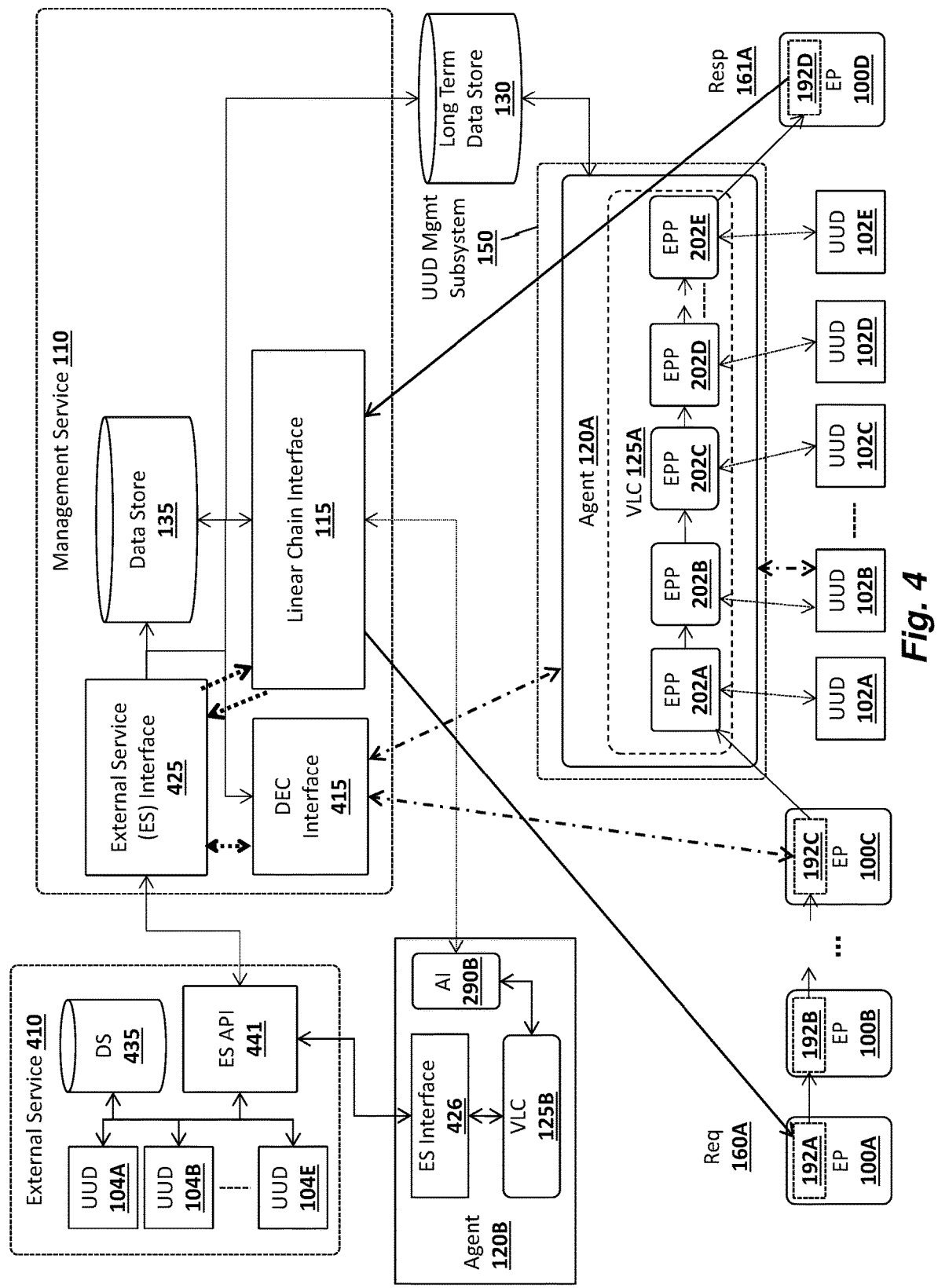
FIG. 4 illustrates one implementation with additional management interfaces and in which a VLC is included in a linear chain.

FIG. 4 illustrates one such implementation with a direct endpoint connection (DEC) interface 415 and an external service (ES) interface 425 for managing endpoints in combination with the linear chain interface 115. In this embodiment, the DEC interface 415 establishes direct connections with endpoints (e.g., endpoint 100C and endpoint 102B via agent 120A in the illustrated example). The DEC interface 415 is used, for example, when additional data is needed to perform a more in-depth analysis of certain endpoints. The ES interface 425 is used to establish connections with various types of external services 410 which provide support for specific types of unmanageable electronic devices 104A-E. For example, most OT and IoT devices can only communicate directly to a particular external service 410. These external services 410 maintain a database 435 of registered devices and associated device state and make this data accessible via an API 441. The external service interface 425 is configured to retrieve endpoint data via the exposed API 441.

In the illustrated example, agent 120B also includes an ES interface 426 to access data associated with its UUD endpoints 104A-E (previously described with respect to FIG. 2) via the ES API 441. As previously described, agent 120B manages a VLC 125B with the data collected for UUD endpoints 104A-E and communicates with the linear chain interface 115 via agent interface 290B (e.g., which uses first and second network addresses to simulate the front-end endpoint and the back-end endpoint, respectively, of the VLC 125B).

In addition, the DEC interface 415 may form a direct connection with one or more of the UUD endpoints 402A-C through the ES interface 425 to communicate with the external service API 441. In response to a DEC interface 415 request, the ES interface 425 may request the corresponding UUD endpoint data via the ES API 441 and provide the data in a response to the DEC interface 415.

These embodiments may collect certain types of endpoint data using the linear chain interface 115 and other types of data using the DEC interface 415 (either/both of which may include UUD endpoints 402A-C of the external service 410). For example, the linear chain interface 115 may be used to collect relatively lower cardinality data, including data with significant duplication between endpoints (e.g., data which can be filtered/compressed using the linear chain and/or virtual linear chain) and the DEC interface 415 may be used to collect relatively higher cardinality data, such as a large set of endpoint-specific data (e.g., data with little or no duplication). The DEC interface 415 may be used, for example, when a large amount of information is required from a specific endpoint or a specific group of endpoints.

In some implementation, the management service 110 automatically selects the interface to use based on the type of data being requested from the corresponding managed endpoint or UUD endpoint. For example, a request for a large amount of data from a specific endpoint will be sent via the DEC interface 415 whereas a request for a plurality of relatively small items of data from multiple endpoints in the same linear chain will be sent via the linear chain interface 115.

As shown in FIG. 4, portions of a given linear chain may include a combination of managed endpoints 100A-D and UUD endpoints 102A-E represented within VLCs 125A. In the illustrated example, the linear chain includes endpoints 100A-100D, with a virtual linear chain 125A comprising endpoint proxies (EPPs) 202A-E forming the portion of the linear chain between managed endpoints 100C and 100D. In this implementation, the linear chain message is passed through endpoints 100A-C in accordance with the installed management software 192A-C. The management software 192C of endpoint 100C is configured to pass the message to endpoint proxy 202A, which it has been configured to view as the next endpoint in the linear chain. The message is then passed through endpoint proxies 202B-E as agent 120A sequentially reads the data from corresponding rows of the endpoint proxy table 310 and aggregates the relevant data associated with UUD endpoints 102A-E in the message. Once the message passes through the final EPP 202E in the VLC 125A, the agent 120A passes the message to the management software running on the final managed endpoint 100D, which adds its own data to the aggregated data and transmits the response message 161A to the linear chain interface 115.

In other instances, the VLC 125A may be included at the front of the overall linear chain (e.g., with EPP 202A designated as the front-end endpoint) or at the end of the overall linear chain (e.g., with EPP 202E designated as the back-end endpoint). Additionally, in some implementations, the VLC 125A may be subdivided and portions included at different locations in the overall linear chain (e.g., EPPs 202A-C may be included between endpoint 100B and endpoint 100C and EPPs 202D-E may be inserted between endpoints 100C and 100D). Additionally, a given linear chain may include VLCs from multiple different agents (e.g., agents 120A and 120B) which collect UUD endpoint data from different types of UUD endpoints.

In various embodiments, the management software 192A-D running on managed endpoints 100A-D implement protocols for autonomously establishing, maintaining, and repairing each linear chain based on a set of predetermined rules, and without global control or manipulation. In implementations with virtual linear chains, the agents 120A-B managing the VLCs 125A-B implement a similar set of protocols and rules for establishing, maintaining, and repairing each virtual linear chain, including the integration of the VLC into linear chains with managed endpoints. Details associated with one such set of protocols are described below with respect to FIGS. 7A-Z. Briefly, each managed endpoint queries the linear chain interface 115 when connecting to the network. Similarly, each agent queries the LCI 115 when a new UUD endpoint has connected to the network. In both cases, the LCI responds with network addresses of endpoints with which the managed endpoint or agent should form a connection.

As mentioned with respect to FIG. 2, each agent 120A can be assigned a range of network addresses to be used for representing UUD endpoints 102A-E as EPPs 202A-E. In these implementations, the agent 120A associates the minimum network address of the range with the EPP 202A operating as the back-end endpoint of the VLC 125A and the maximum network address of the range with the EPP 202E operating as the front-end endpoint 202E. In some implementations, the agent 120A runs on an electronic device with two network adapters, one of which is associated with the minimum network address and the other which is associated with the maximum network address. These network addresses may be permanently or dynamically assigned network addresses which the agent 120A registers with the linear chain interface 115 (i.e., so the addresses can be used for transmitting requests 160B and receiving responses 161B).

In embodiments, the local network router may be configured to route any network packets with network addresses within the specified range to the agent 120A, which will then determine the destination UUD endpoints based on additional identification information (e.g., the MAC address of the UUD endpoint or other information uniquely identifying the UUD endpoint).

Alternatively, or additionally, the linear chain interface 115 may be configured to recognize that any network addresses within the allocated range are associated with the agent 120A. Thus, if the linear chain interface 115 needs to direct a request to a particular UUD endpoint with a network address range managed by the agent 120A, such as UUD endpoint 102C, it will transmit the request using the network address of one of the network adapters used by the agent 120A and include additional information in the request to uniquely identify the UUD endpoint (e.g., such as the MAC address of the UUD endpoint).

In some implementations, the sequential set of network addresses between the minimum address and the maximum address are reserved to the agent 120A, so that the agent can associate these addresses with various endpoint proxies 202A-E as the corresponding UUD endpoints 102A-E connect and disconnect from the network. Thus, when the DEC interface 415 establishes a direct connection to one of the UUD endpoints, such as UUD 102C, the request is directed to the agent 120A. The agent 120A receives the request, identifies the associated EPP and UUD endpoint (e.g., EPP 202C for UUD endpoint 102C), and provides the requested data in a response message 161A (e.g., from endpoint proxy table 310 or by communicating with the UUD endpoint 102C). The agent 120A may transmit the response message 161A using the destination network address from the request 160A to emulate a response from a managed endpoint.

Over time, existing UUD endpoints 102A-E will disconnect and new UUD endpoints will connect (e.g., as managed by the external service which maintains the UUD endpoints). Some implementations of the agent 120A manage these changes by removing the data from corresponding rows from the endpoint proxy table 310 (for disconnected endpoints) and replacing this data with data associated with new UUD endpoints. The agent 120A may also add rows as needed if the number of UUD endpoints is increasing. If the range of network addresses allocated to an agent 120A becomes insufficient based on the number of UUD endpoints, then the agent may request a larger range of addresses and/or a new agent may be executed (on the same or a different electronic device) and assigned a different address range for mapping to UUD endpoints 102A-E.

Figure 5:
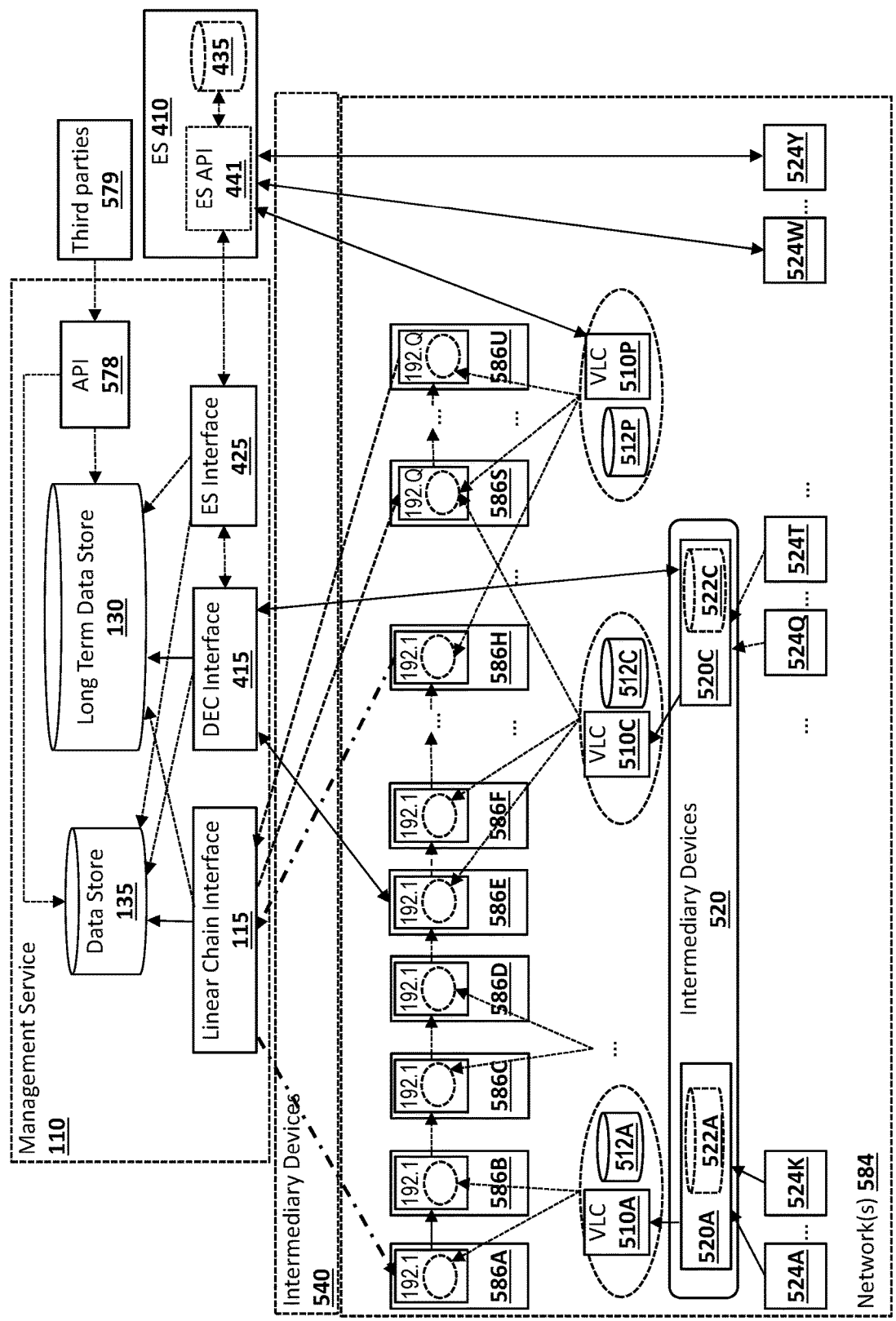
FIG. 5 illustrates additional details in accordance with one or more embodiments of the invention.

FIG. 5 illustrates a specific implementation of the management service 110 which includes a linear chain interface 115 collecting management data from a set of endpoints 586A-U and a DEC interface 415 illustrated with direct connections to an endpoint 586E, the external service interface 425 (to access data from UUD endpoints 524W-Y data from external service 410), and an intermediary device 520C. The intermediary devices 520A-C are shown with corresponding local storage 522A-C representing in-memory storage and/or persistent storage devices. The intermediary devices 520 may include electronic devices, such as firewall(s), devices inside OT network(s), and electronic devices that enable communication with UUD endpoints 524A-T (e.g., a gateway using OT network protocols) and/or aggregate data associated with UUD endpoints 524A-T within data stores 522A-C.

All connections to endpoints are illustrated passing through another set of intermediary devices 540 which may include electronic devices inside and/or outside of network(s) 584 of the various endpoints (e.g., such as networks 105B-C in FIG. 1). Inside network(s) 584 these may be one or more of 1) network devices including firewall(s); and/or 2) electronic devices or linear chains that aggregate data. Outside of network(s) 584 these may be network devices and/or gateways that communicatively connect to cloud services, including the management service 110.

The various UUD endpoints 524A-T coupled to intermediary devices 520 may be incorporated within virtual linear chains 510A-C. Virtual linear chain 510A receives data associated with UUD endpoints 524A-K via intermediary device 520C and VLC 510C receives data associated with UUD endpoints 524Q-T via intermediary device 520C. Although not illustrated in FIG. 5, the VLCs 510A-C may be implemented by agents running on electronic devices as previously described (see, e.g., FIG. 3 and associated text). One or more of the electronic devices implement another VLC 510P, shown with local storage 512P, for UUD endpoints 524A-524Y which are accessed via the API 441 of external service 410. These UUD endpoints 524W-Y may be devices which are only accessible via ES API 441 (e.g., IoT devices, where ES 410 is the IoT device service). The virtual linear chain 510P may be formed by agents operating on the electronic devices (not shown) using data for the UUD endpoints 524W-Y collected through the ES API 441.

The linear chain interface 115 is coupled to manageable endpoint devices 586A-U capable of supporting a management client. The numbering at the top of each endpoint device 586A-U, i.e., 192x, indicates management software, where x indicates the linear chain in which the endpoint device is currently configured. Thus, endpoints 886A-H are participating in linear chain 1 and endpoints 886S-U are participating in linear chain Q.

As indicated by connecting arrows, the virtual linear chains 510A, 510C, 510P may be implemented within any of the managed devices 586A-U, such that the corresponding linear chains include both managed endpoints 586A-U and UUD endpoints 524A-T (e.g., represented as proxy endpoints as previously described). Alternatively, or additionally, one or more of the VLCs 510A, 510C, 510P may be implemented electronic devices separate from the endpoints 586A-U.

An API 571 may also be exposed by the management service to allow third parties 579 (e.g., additional external services) to push UUD data into the short term data store 135 and/or the long term data store 130. Additionally, the API 578 may allow third parties to access and/or modify the managed endpoint data from the short term data store 135 and/or the long term data store 130 (e.g., to be used within a third party management application or service).

Figure 6A:
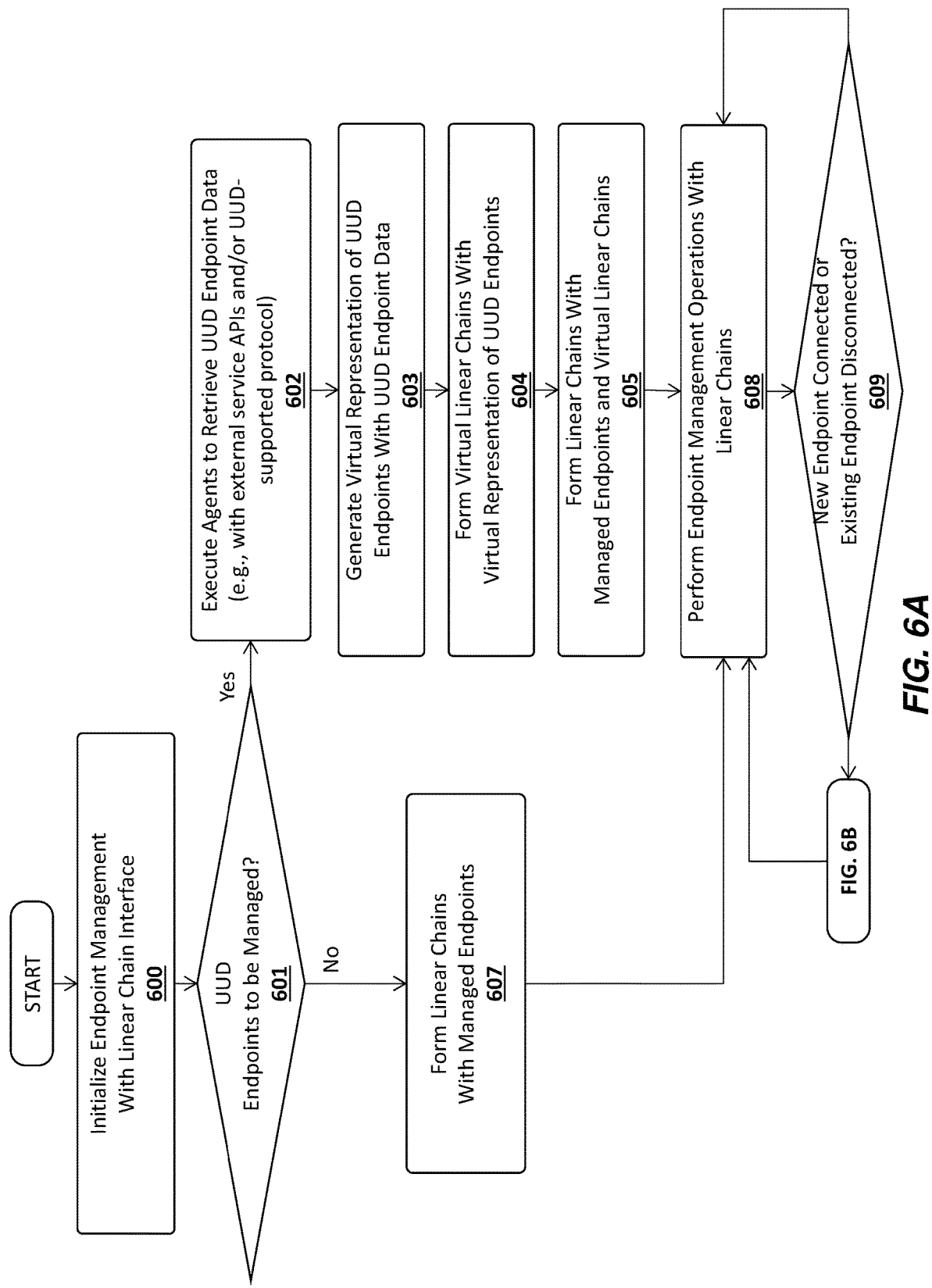
FIG. 6A-B illustrates a method in accordance with one or more implementations.
Figure 6B:
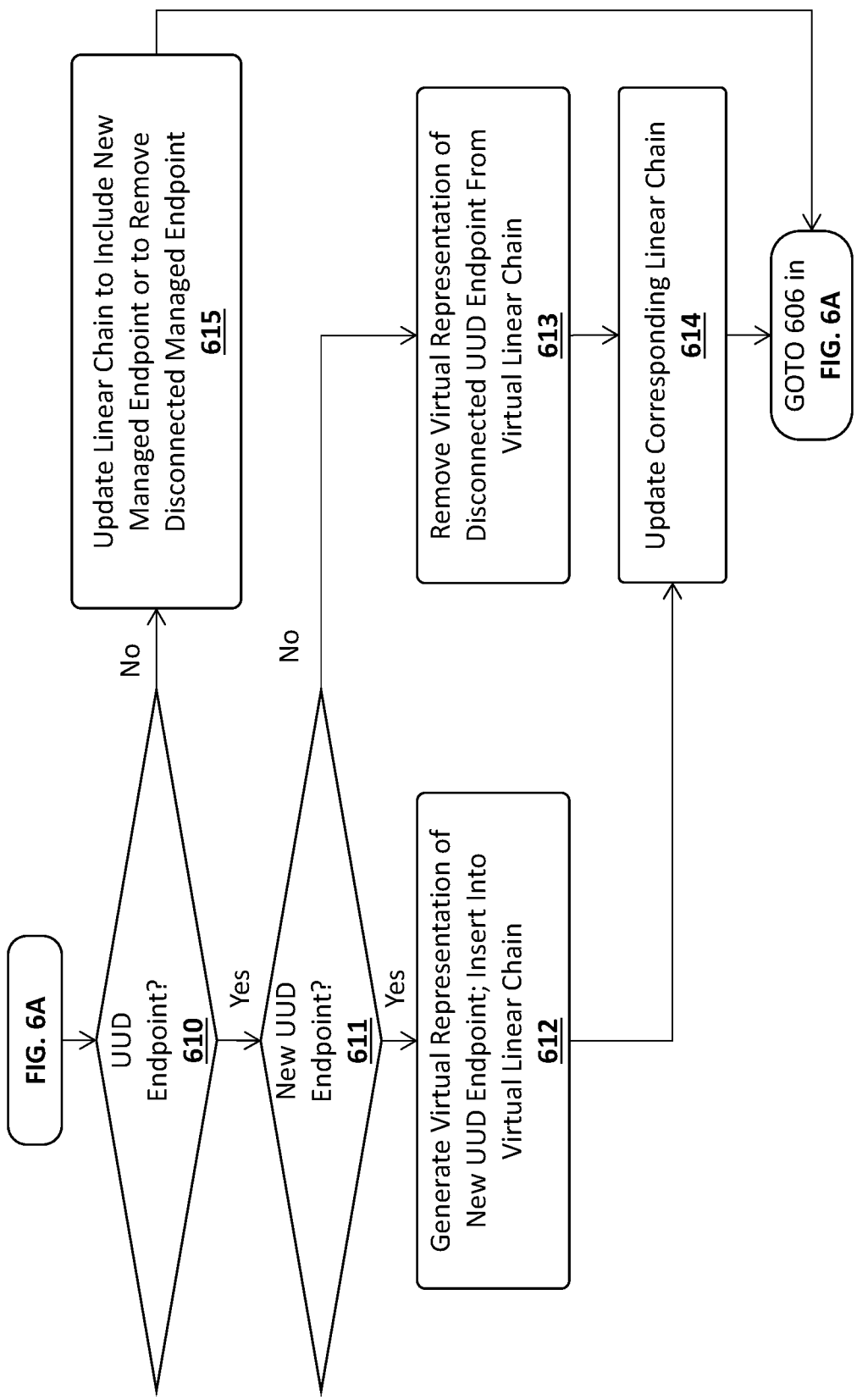

A method in accordance with one implementation is illustrated in FIGS. 6A-B. The method may be implemented on the various client and system-level architectures described herein (e.g., using management clients, agents, and a linear chain interface), but is not limited to any particular architecture.

At 600, an endpoint management service with a linear chain interface is initialized (e.g., executed on one or more electronic devices). At 601, if no UUD endpoints are to be managed by the endpoint management service (i.e., only managed endpoints are to be managed), determined at 601, then the managed endpoints form linear chains at 607 and endpoint management operations are performed with the linear chains at 608.

If one or more UUD endpoints are to be managed, then at 602, one or more agents are executed to retrieve UUD endpoint data. For example, the agents may access the UUD endpoint data via external service APIs and/or via direct communication with a UUD endpoint supported protocol. At 603, virtual representations of the UUD endpoints are generated based on the UUD endpoint data and, at 604, one or more virtual linear chains (VLCs) are formed based on the virtual representations. At 605, linear chains are formed using a combination of the managed endpoints and the virtual linear chains. At 608 endpoint management operations are performed with the linear chains (e.g., passing messages between endpoints to collect endpoint data and perform management operations).

If a new endpoint is connected or an existing endpoint is disconnected, determined at 609, then the process flows to FIG. 6B. If the endpoint is not a UUD endpoint, determined at 610, then at 615, one or more corresponding linear chains are updated to add the new managed endpoint or to remove one or more managed endpoints, and the process returns to 606.

If the endpoint is a new UUD endpoint, determined at 611, then at 612, a virtual representation of the new UUD endpoint is generated and inserted into a corresponding virtual linear chain. For example, existing virtual representations and/or associated data structures may be updated to reflect the new UUD endpoint (e.g., a new row may be inserted in the endpoint proxy table 310). If one or more UUD endpoints have been disconnected, then at 613, the virtual representations of these UUD endpoints are removed from one or more corresponding virtual linear chains (e.g., deleting corresponding rows of the endpoint proxy table 310). At 614, the corresponding linear chain is updated and the process returns to 606.

While some of the implementations described above form a linear chain using a combination of managed endpoints and unmanaged endpoints in a virtual linear chain, other embodiments may form some linear chains using only managed endpoints and other linear chains using only virtual linear chains.

In some embodiments, a VLC running on one of the managed electronic devices is implemented as a virtual machine which uses two network interfaces to pretend to be a both the front-end and back-end endpoints in the linear chain, and uses the UUD database to harvest answers to queries. If query results necessitate connecting to the endpoint management server directly, the virtual machine uses network address translation (NAT) techniques to mimic that endpoint.

As a result of the architectures and techniques described above, no modifications are needed at the endpoint management service 110. Each VLC presents network interfaces that emulate both the forward and backward leaders of its linear chain, so that the endpoint management service 110 perceives it to be simply another linear chan. The VLC inspects the DB for query results, using modified sensors that use SQL queries instead of code to inspect the local system.

As mentioned, different types of agents may be used for managing different groups of UUD endpoints. In FIGS. 1-2, for example, agent 120A may be specifically configured for managing a first type of UUD endpoints 102A-E (e.g., IoT devices or OT devices), while agent 120B is configured for managing a second type of UUD endpoints 104A-E (e.g., Chromebooks). Thus, different agents may perform different sets of operations and rely on different APIs for identifying and ingesting different UUD endpoints.

The process of discovering and ingesting UUD endpoints across different services can be complex. For instance, identical IoT devices may be deployed at multiple corporate sites and/or may be configured on similarly-configured networks with similar network address translation (NAT). Thus, two UUD endpoints may occasionally have identical non-routable IP addresses (e.g., such as 192.168.0.17). In some implementations, UUD endpoints are uniquely identified by agents 120A-B and/or the management service 110 using MAC addresses of the UUD endpoints, which are always unique.

In some implementations, the various agents 120A-B representing UUD endpoints 102A-E, 104A-E and the management software 192A-D running on managed endpoints 100A-D coordinate to establish, maintain, and dynamically modify each linear chain based on a set of predetermined rules, and without global control or manipulation. A detailed description of techniques used to form linear chains is provided below with respect to FIGS. 7A-Z. These techniques may be may be used both by managed endpoints 102A-E 104A-E and agents 120A-B representing UUD endpoints with EPPs 202A-E, with the only difference being that, in some implementations, each agent may be assigned a particular network address range to ensure that its corresponding VLC comprises a plurality of contiguous UUD endpoints in the overall linear chain (e.g., as shown in FIG. 4).

Briefly, when a new managed endpoint or UUD endpoint (managed by an agent) is connected to the network, the managed endpoint or agent (on behalf of the UUD endpoint) transmits a message to the linear chain interface 115 indicating a network address (e.g., the network address of the managed endpoint or the network address assigned to the UUD endpoint by the agent). For example, an agent may transmit the network address used to represent the new UUD endpoint in the VLC while the managed endpoint may transmit its currently assigned network address. In response, the linear chain interface 115 identifies network addresses of at least two endpoints with which are numerically closest to the network address of the new endpoint, providing at least one network address which is larger (succeeding) and at least one which is smaller (preceding). Multiple succeeding and preceding addresses may be transmitted to account for the possibility that some of these endpoints may have disconnected from the network.

The management software on the new endpoint uses these addresses to identify the two endpoints which are its closest neighbors (based on network address ordering) and coordinates with these two endpoints to be inserted between then in the linear chain. Once the managed endpoint is successfully configured in the linear chain, a confirmation may be sent to the linear chain interface 115.

With respect to the agent, if the minimum and maximum network addresses available to the agent have already been assigned (e.g., to the front-end EPP 202A representing UUD endpoint 102A and the back-end EPP 202E representing UUD endpoint 102E in FIG. 4), then the agent will insert the new EPP corresponding to the new UUD endpoint within the VLC 125A based on its network address relative to the network addresses of other EPPs currently in the VLC 125A. When the agent replaces a front-end EPP or a back-end EPP, it uses the response from the linear chain interface 115 to identify the closest managed endpoint to the front-end EPP or back-end EPP. For example, when inserting EPP 202A representing UUD endpoint 102A into the linear chain, the linear chain interface 115 will identify EP 100C as the closest endpoint with a preceding network address. Similarly, when inserting EPP 202E into the linear chain, the linear chain interface 115 will identify EP 100D as the closest endpoint with a succeeding network address. Once the new UUD endpoint is inserted, the agent transmits a confirmation response to the linear chain interface 115.

Figure 7A:
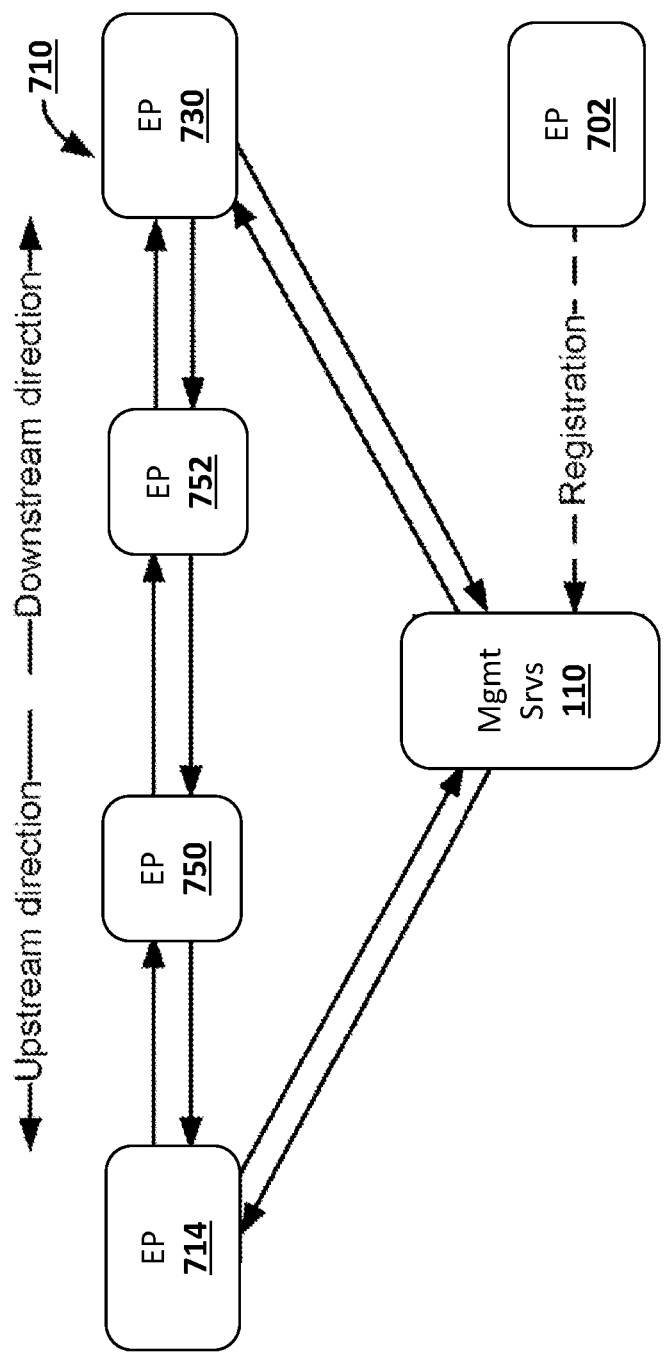
FIG. 7A-Z illustrate different sets of protocols for forming and managing a linear chain, which may include virtual linear chain components in certain implementations.
Figure 7B:
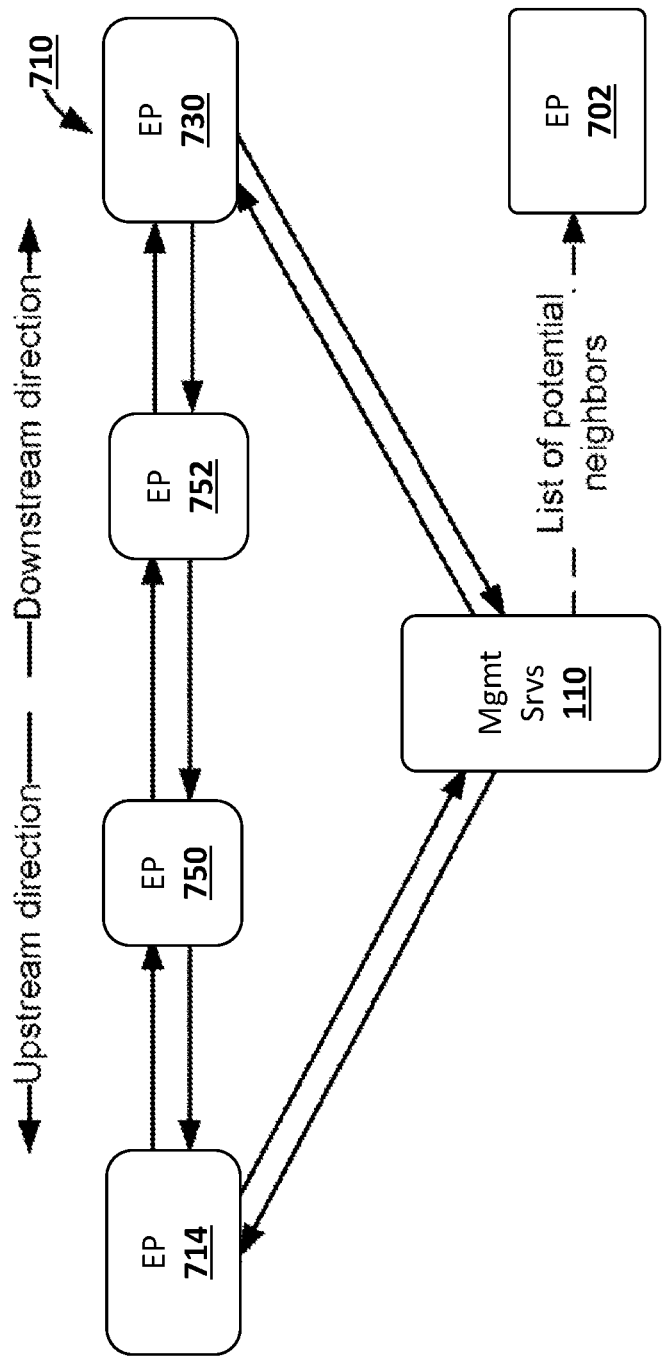
Figure 7C:
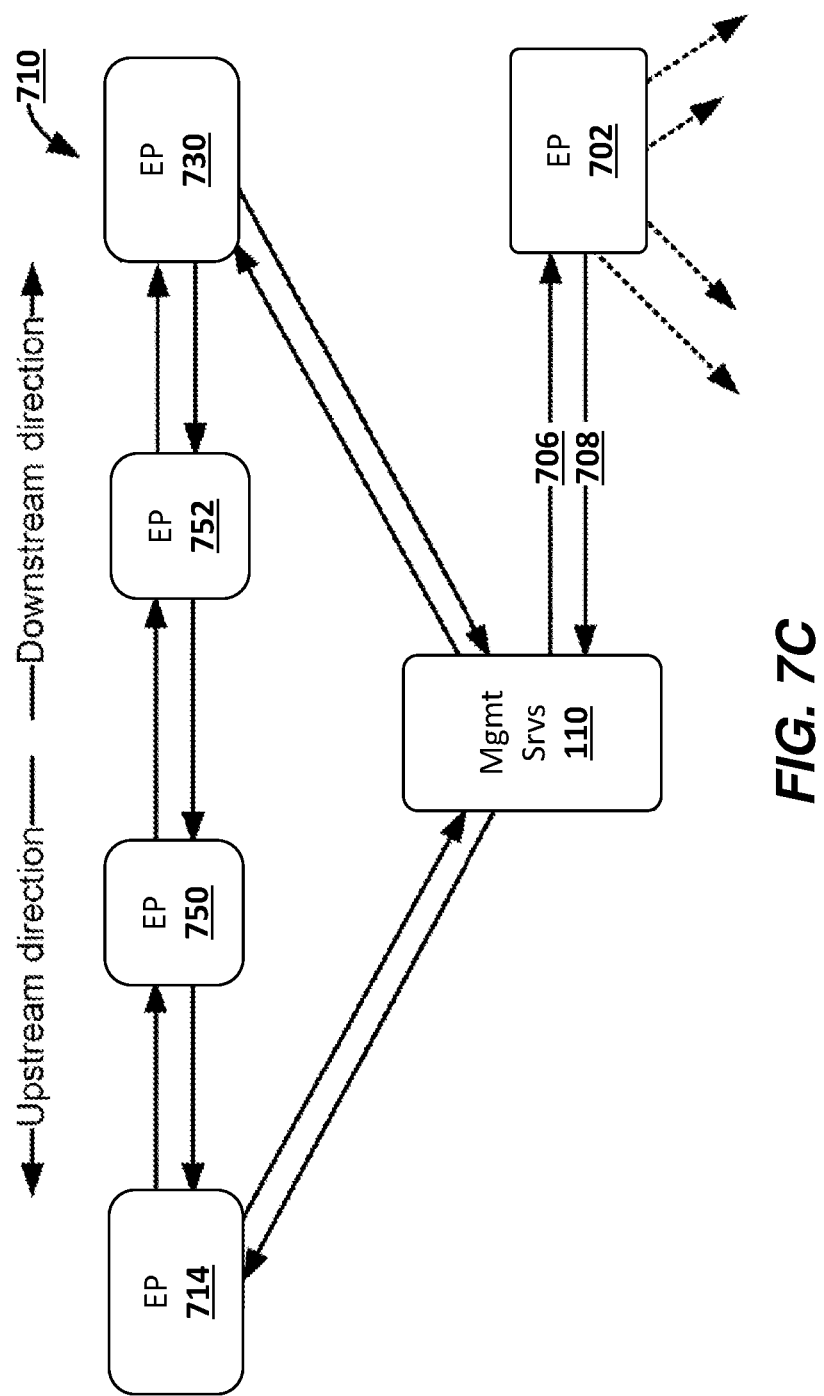
Figure 7D:
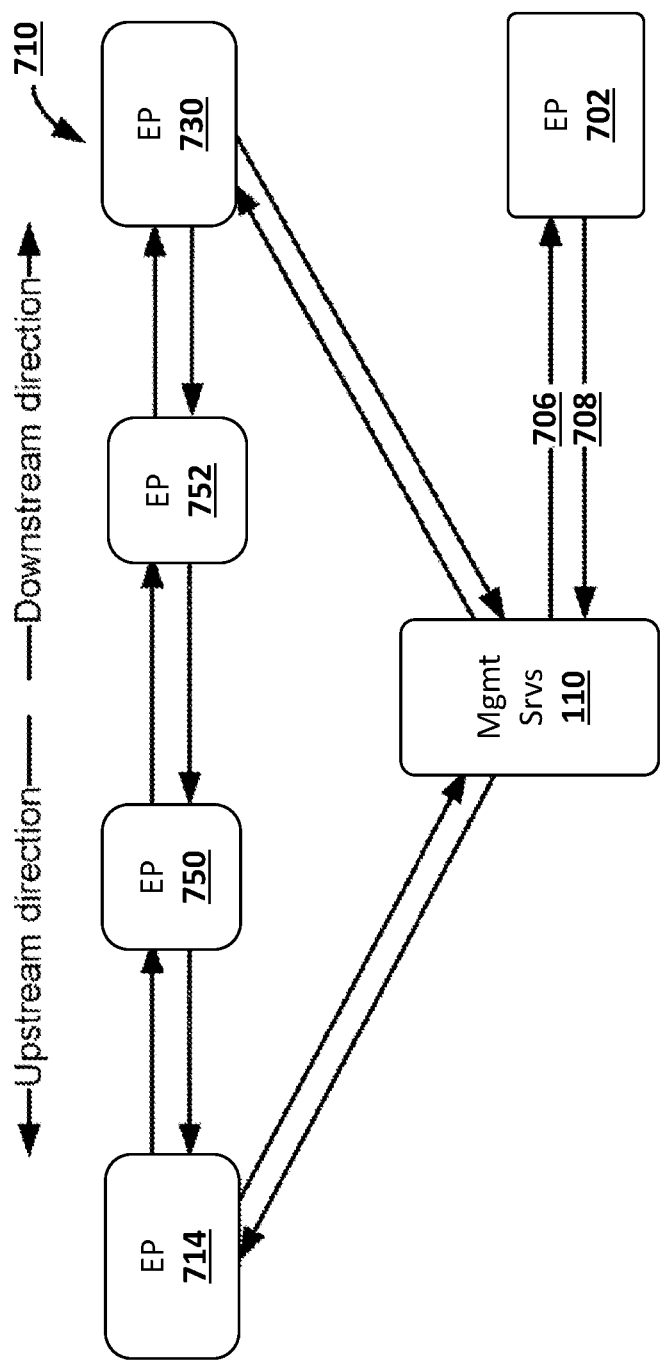
Figure 7E:
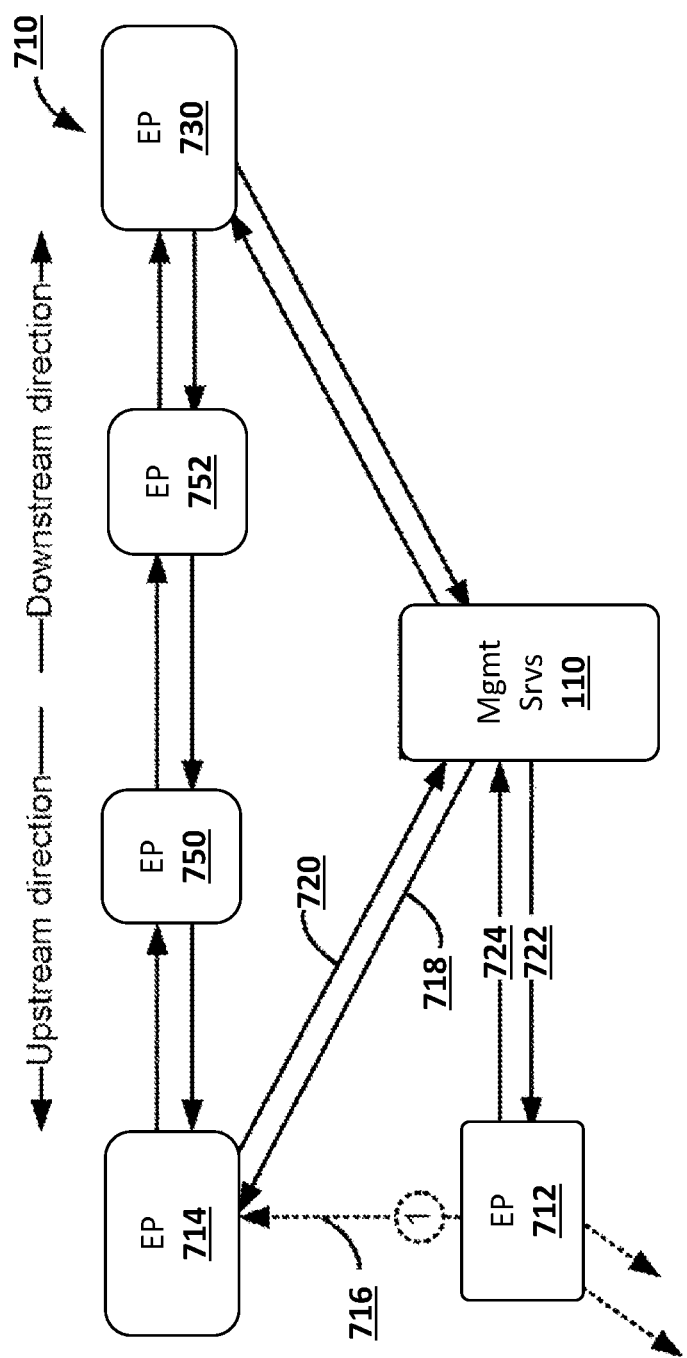
Figure 7F:
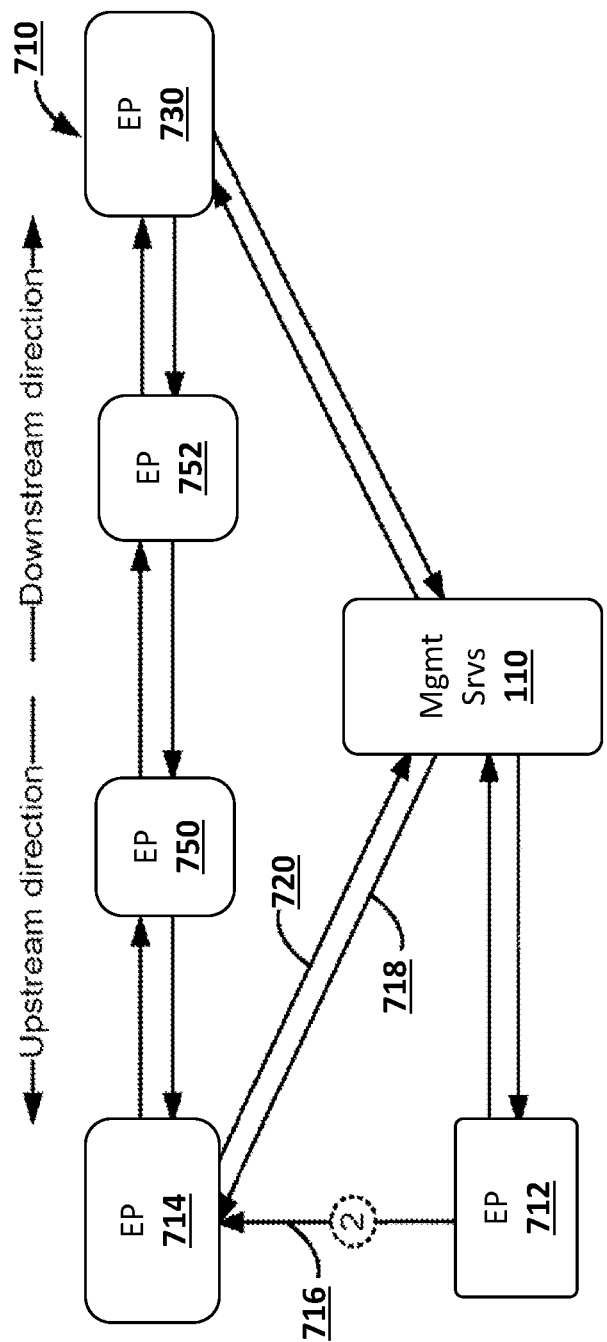
Figure 7G:
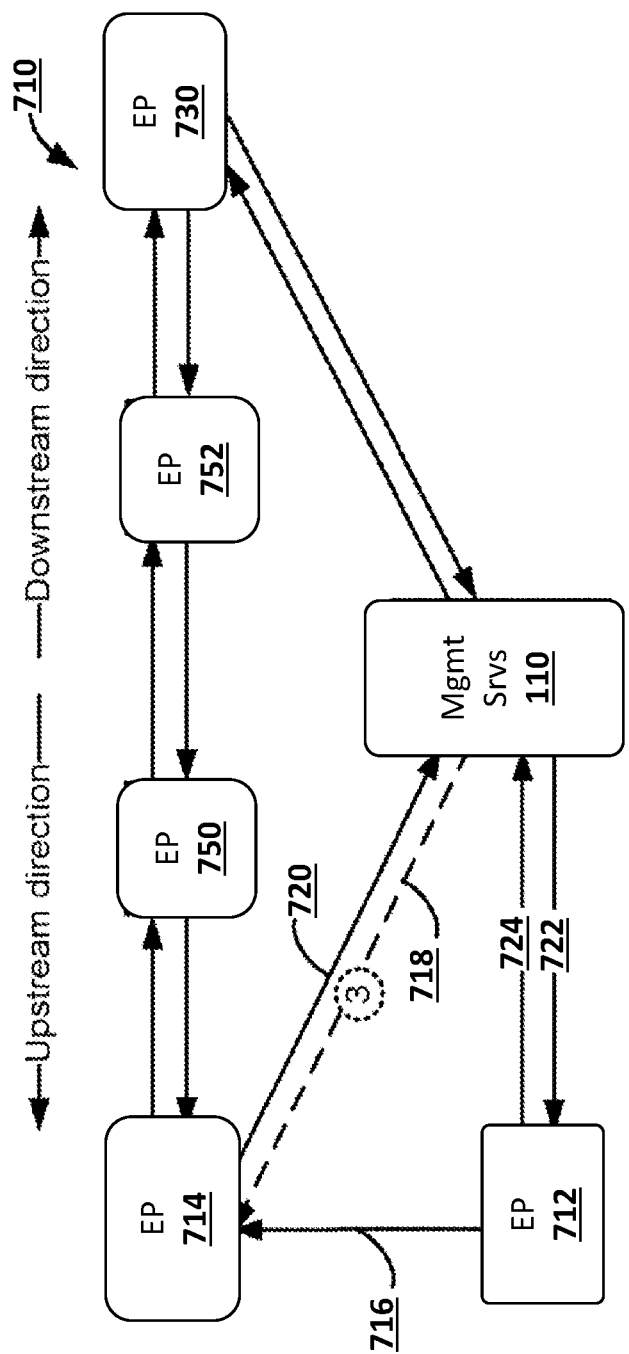
Figure 7H:
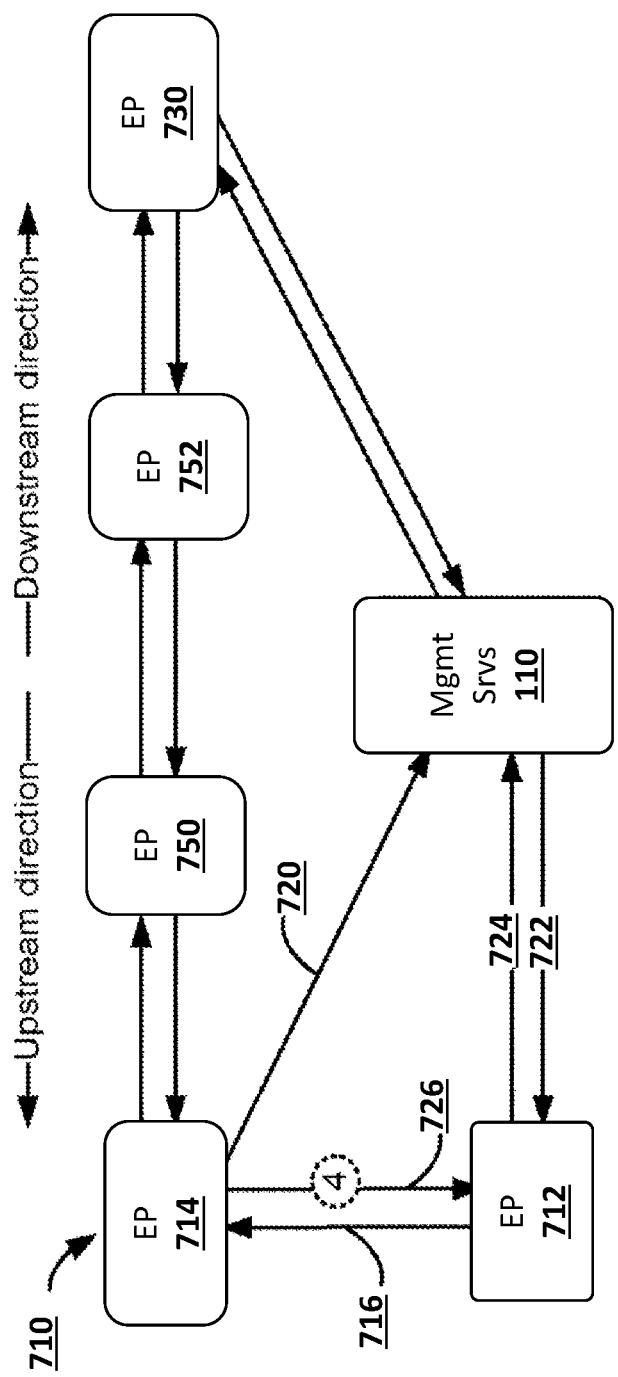
Figure 7I:
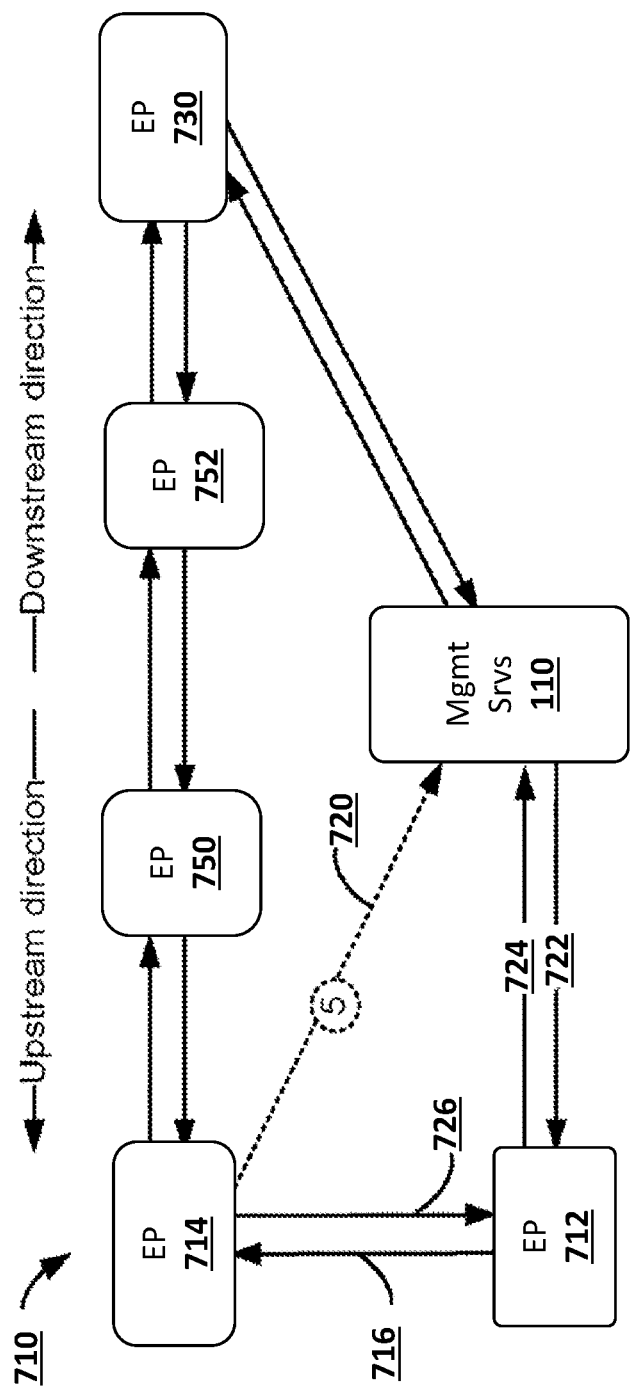
Figure 7J:
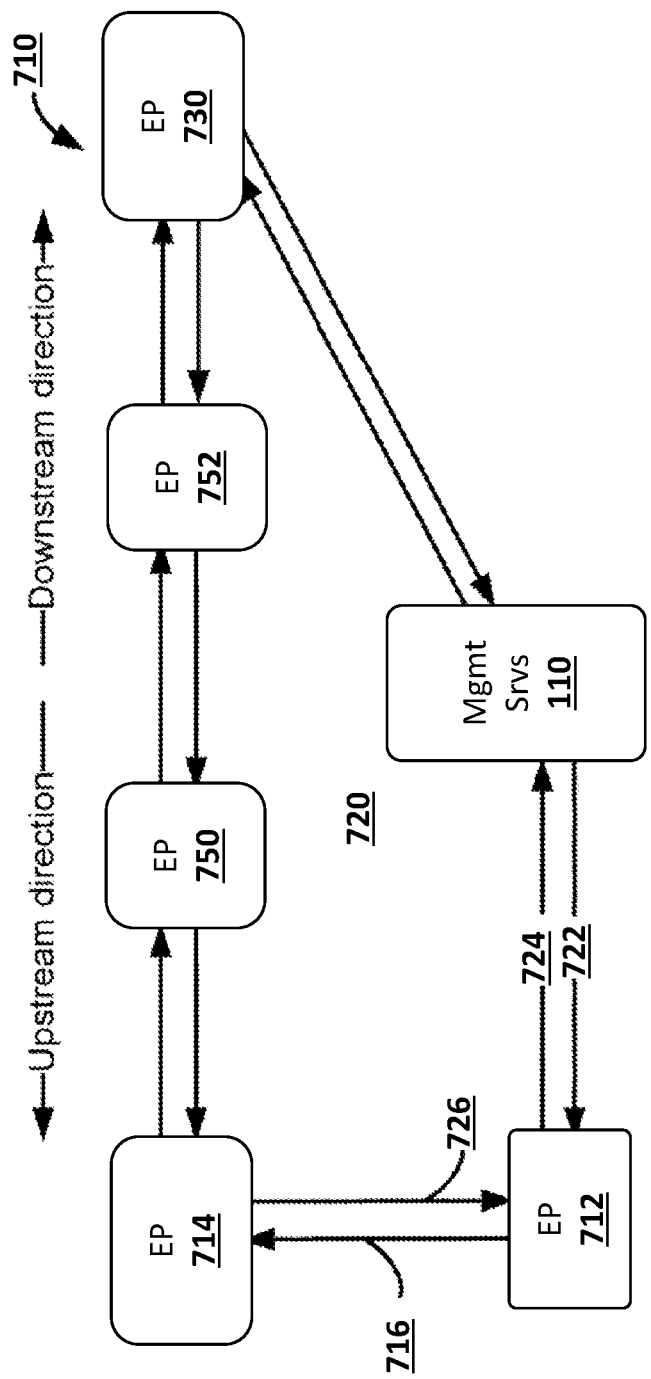
Figure 7K:
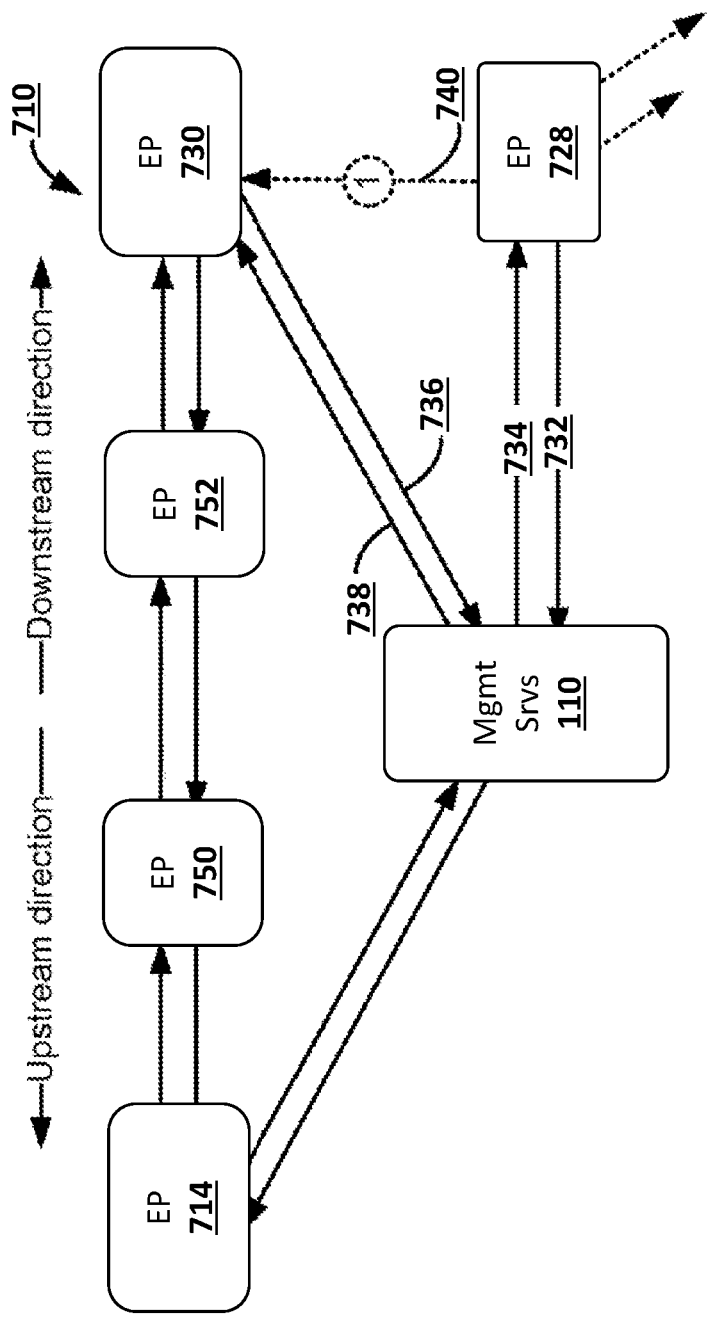
Figure 7L:
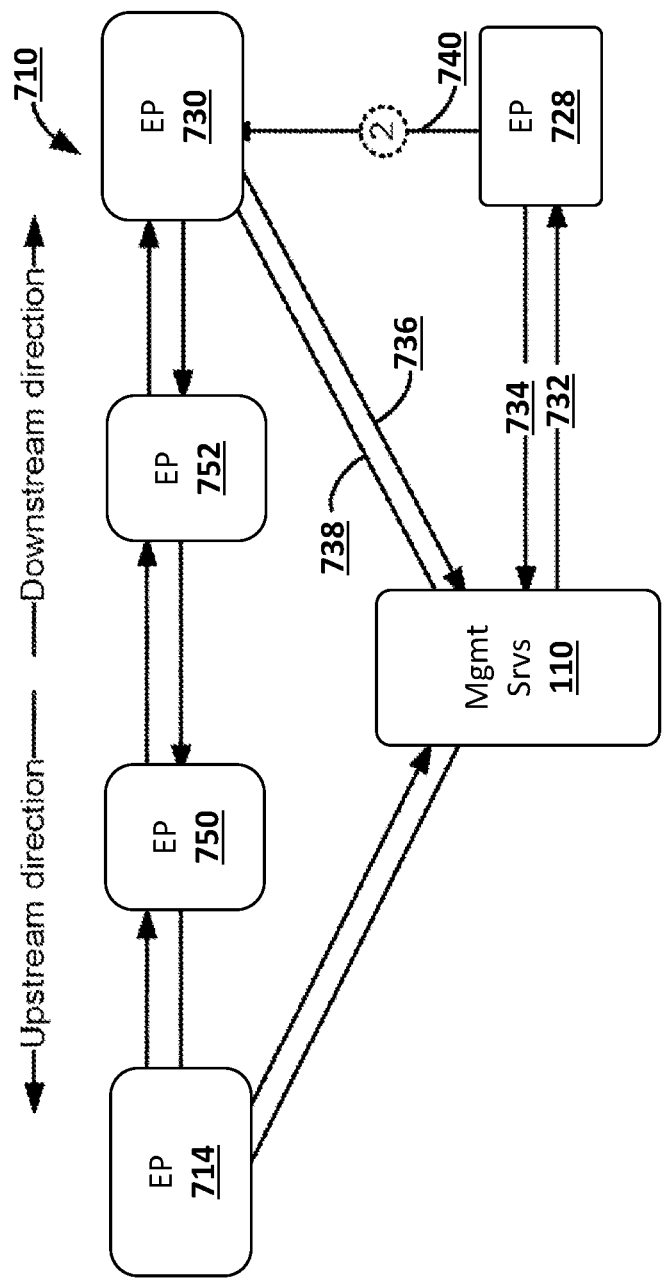
Figure 7M:
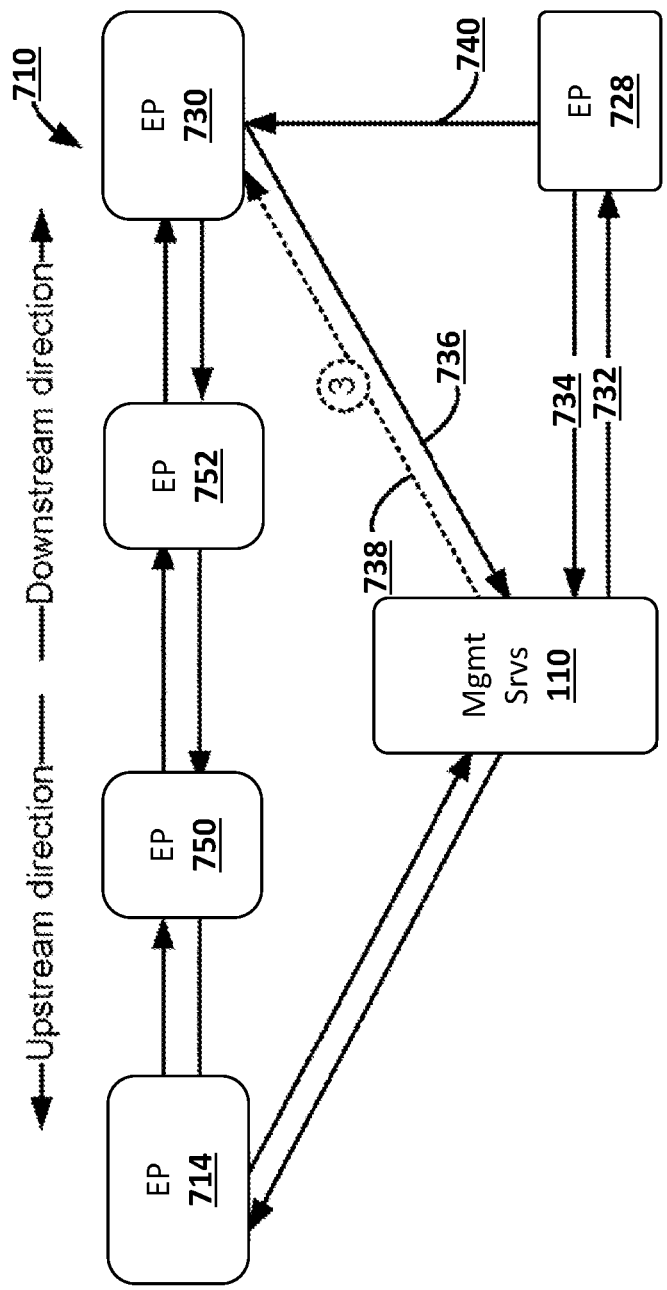
Figure 7N:
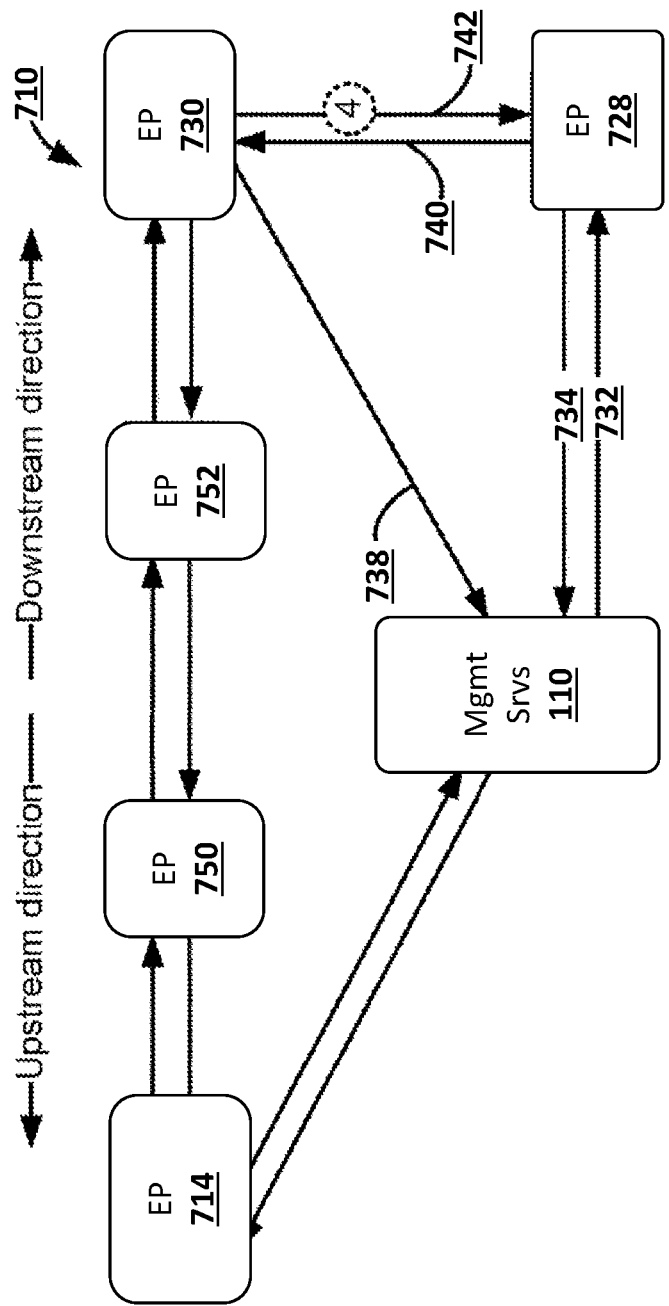
Figure 7O:
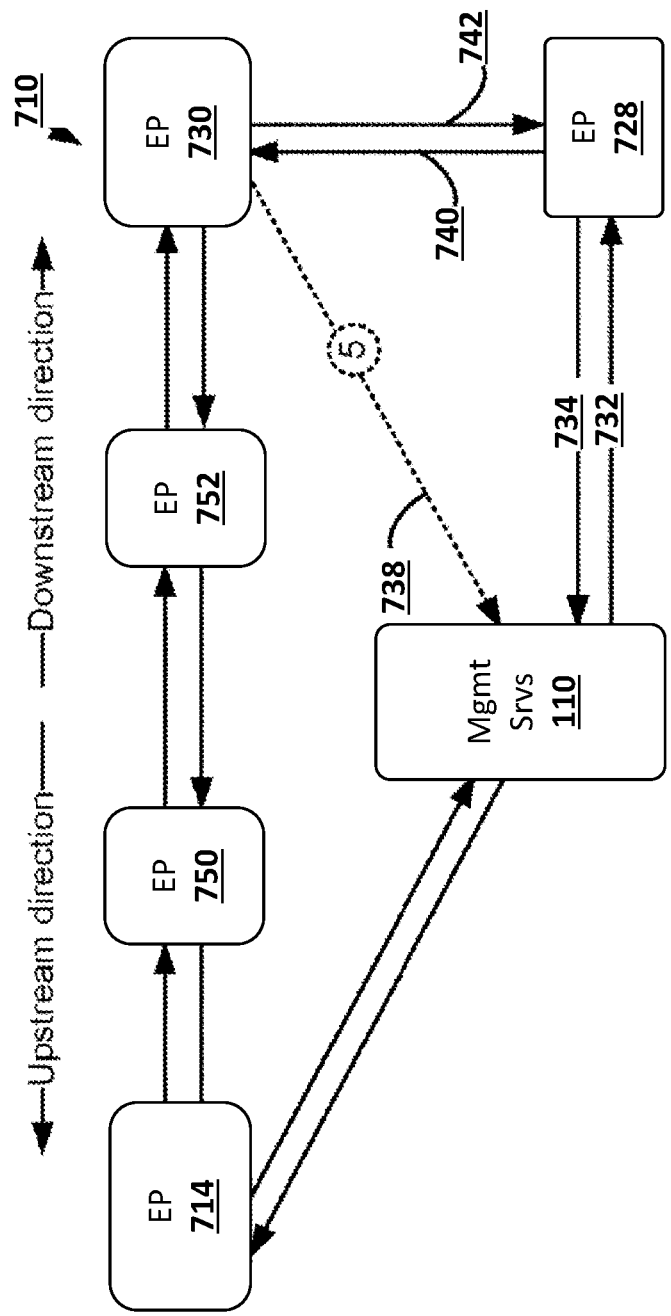
Figure 7P:
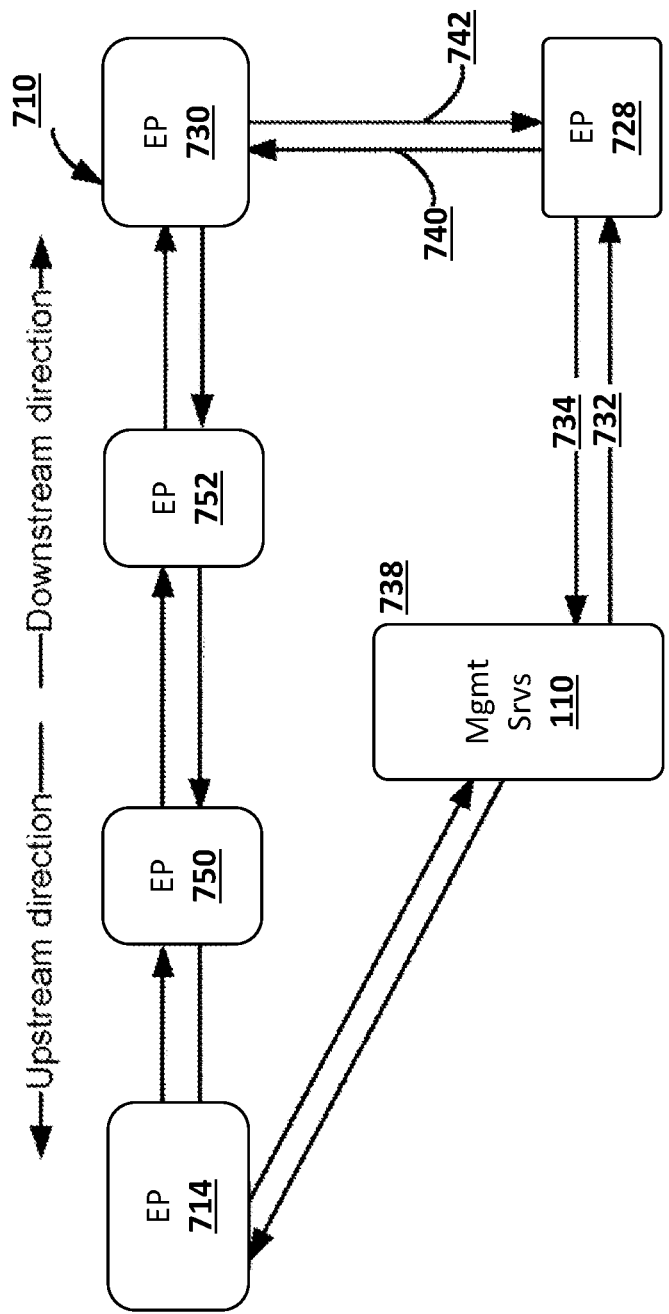
Figure 7Q:
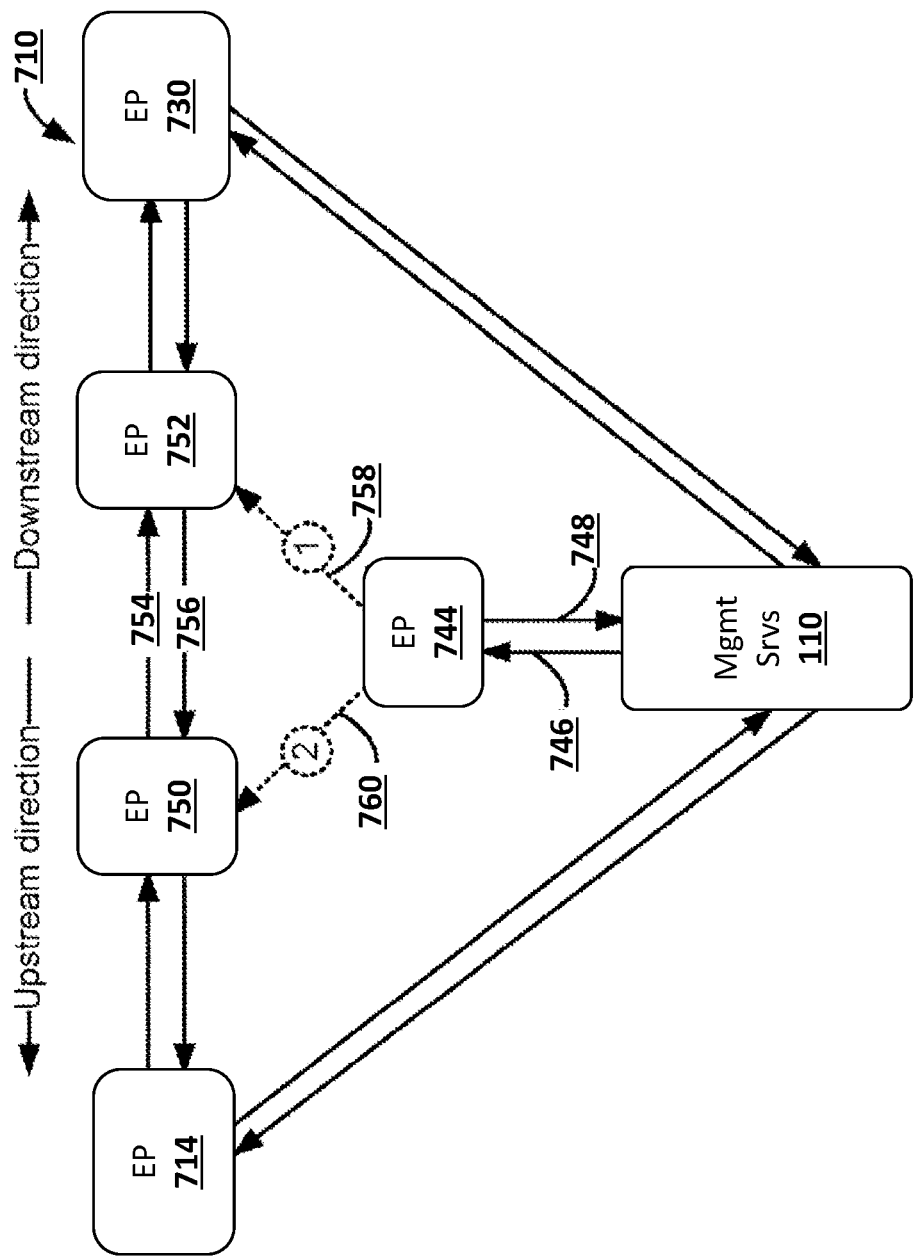
Figure 7R:
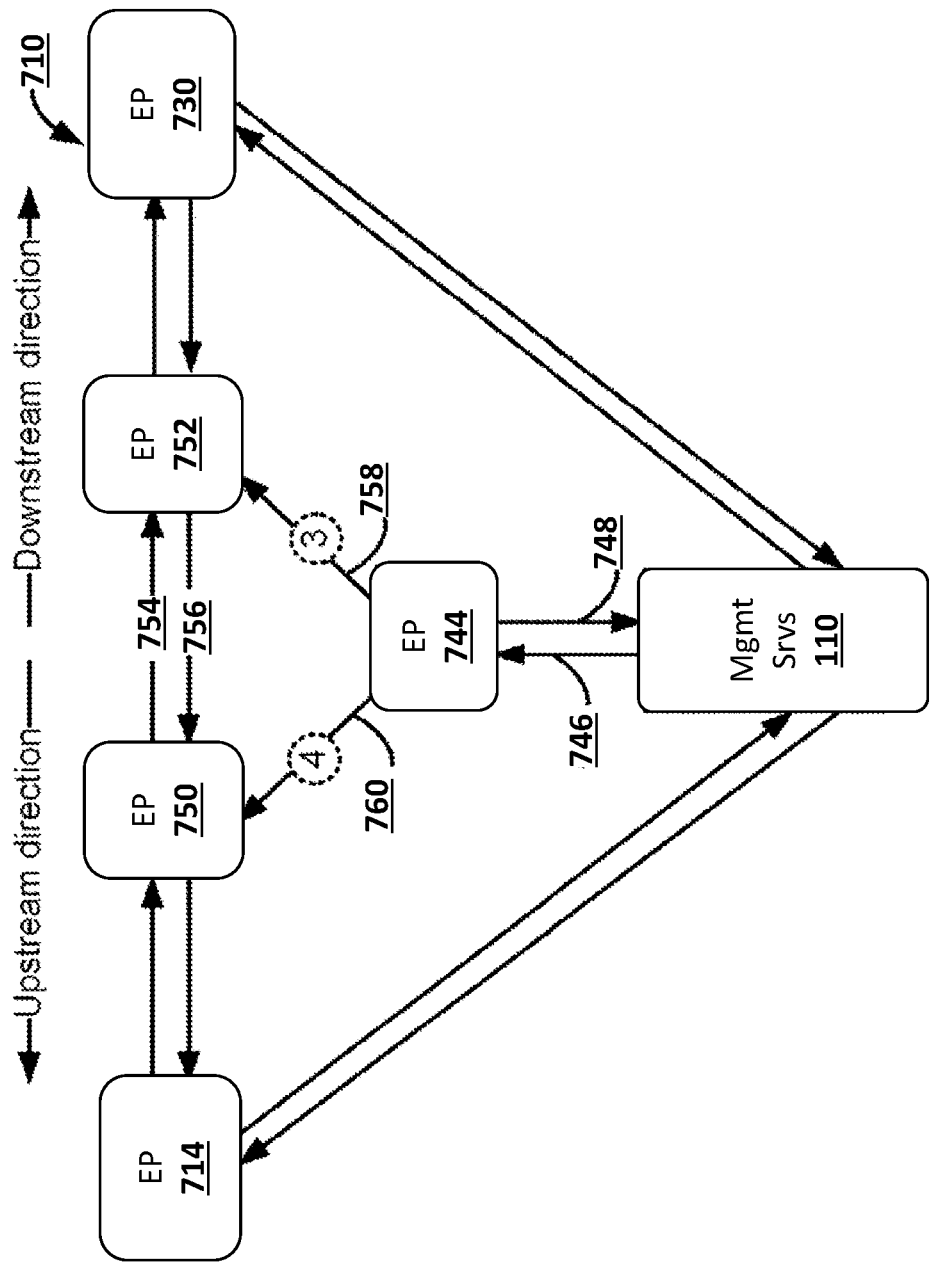
Figure 7S:
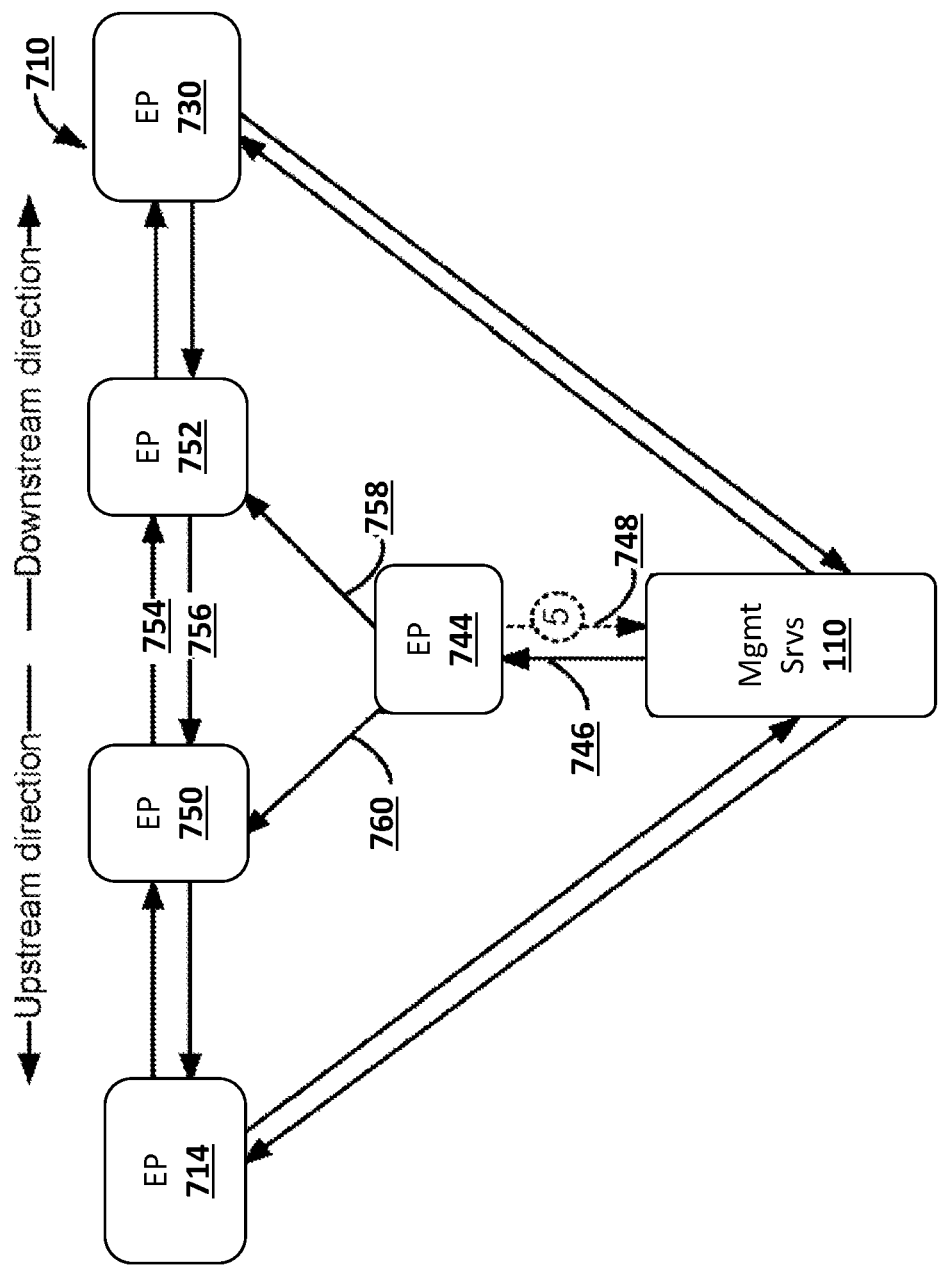
Figure 7T:
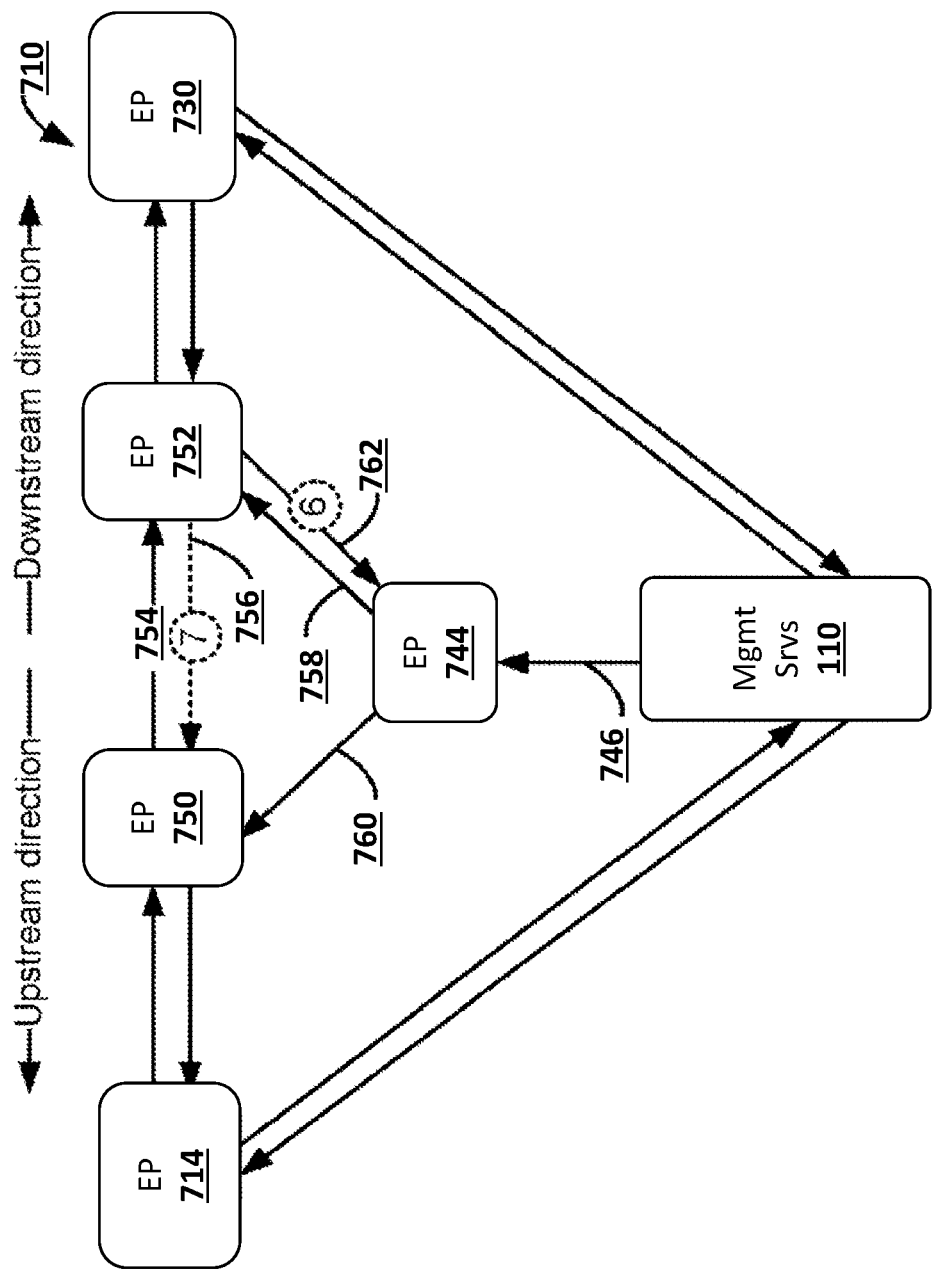
Figure 7U:
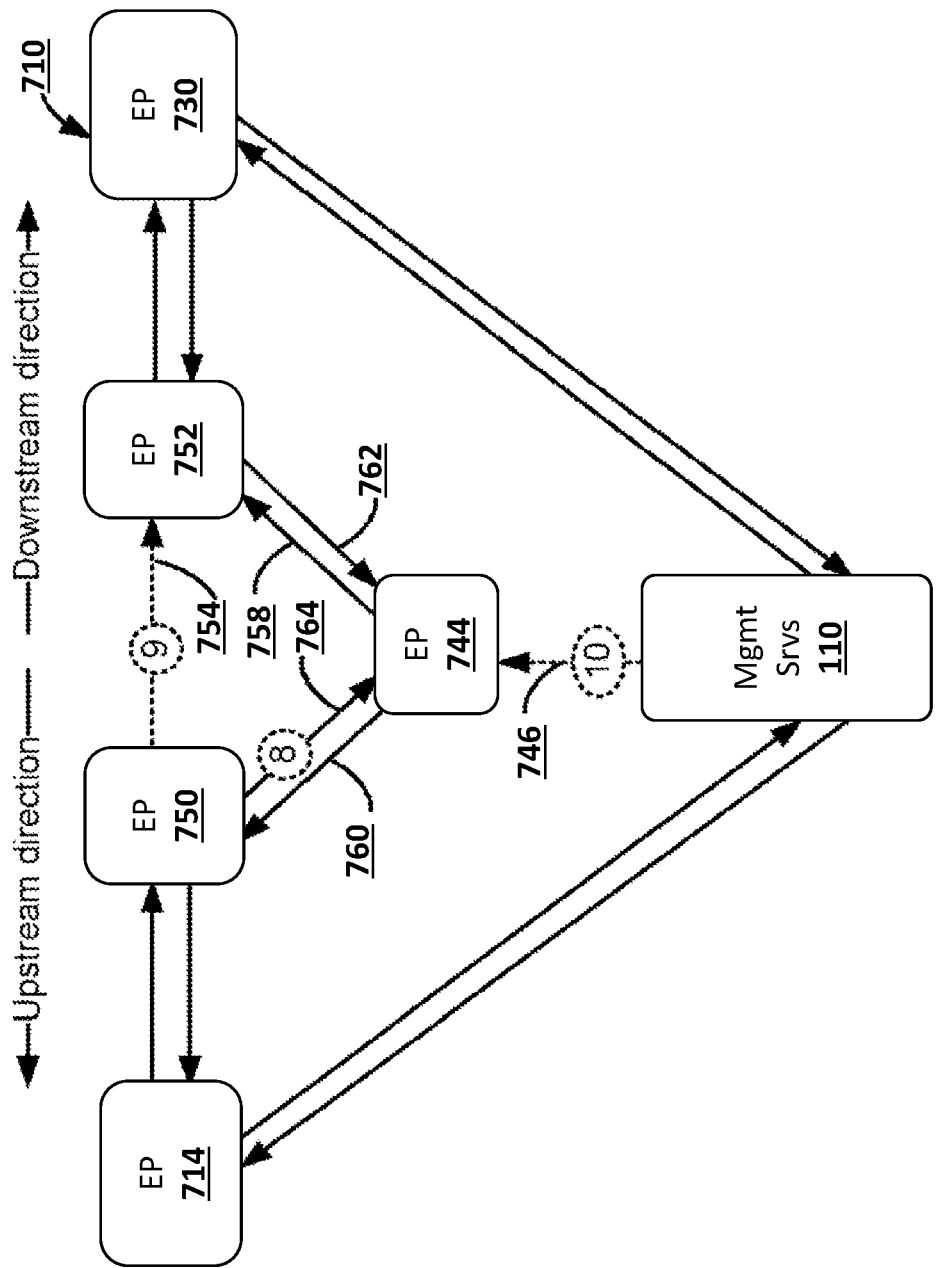
Figure 7V:
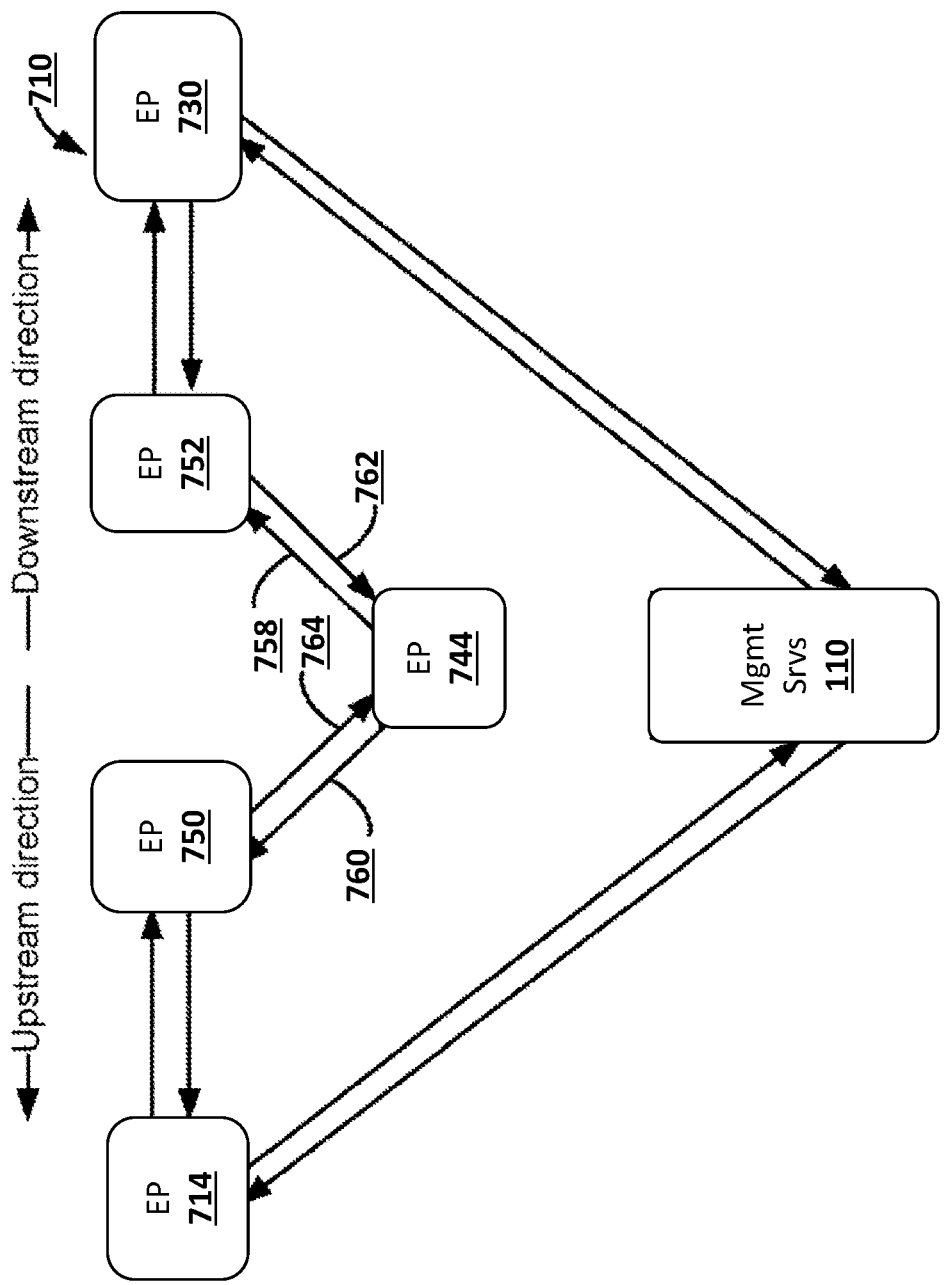
Figure 7W:
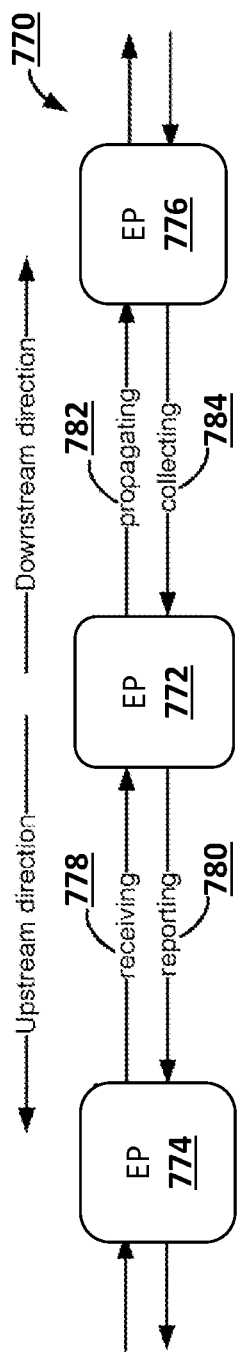
Figure 7X:
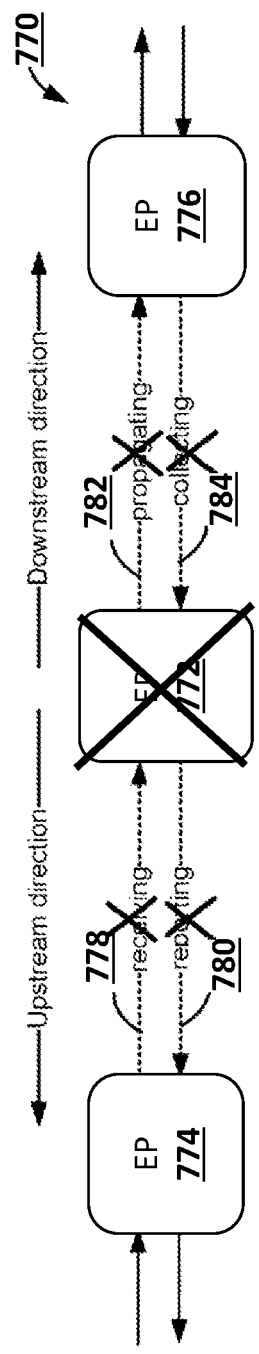
Figure 7Y:
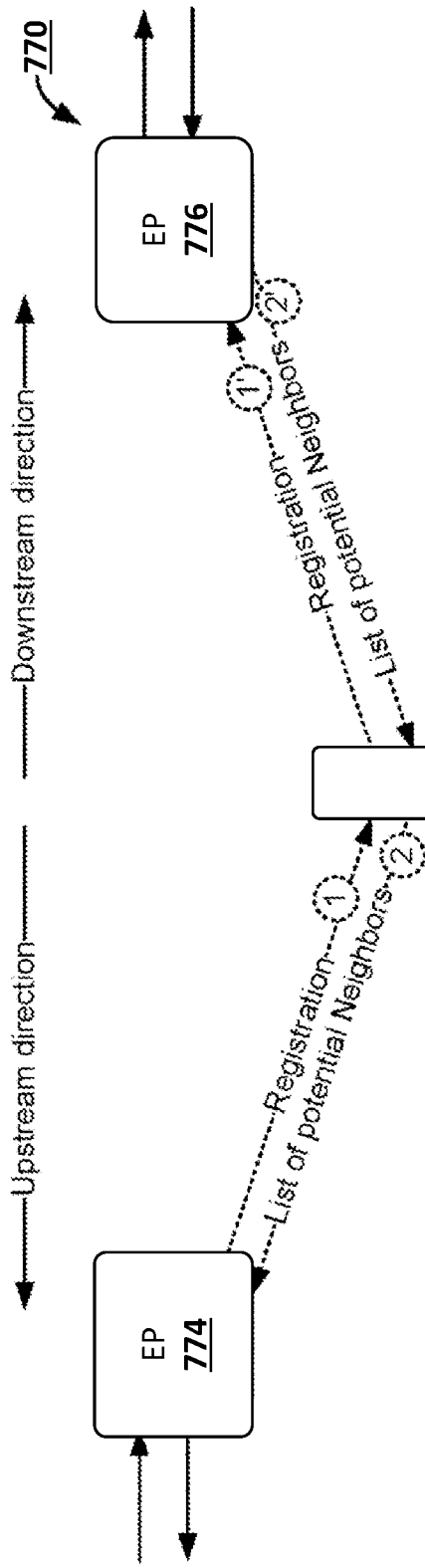
Figure 7Z:
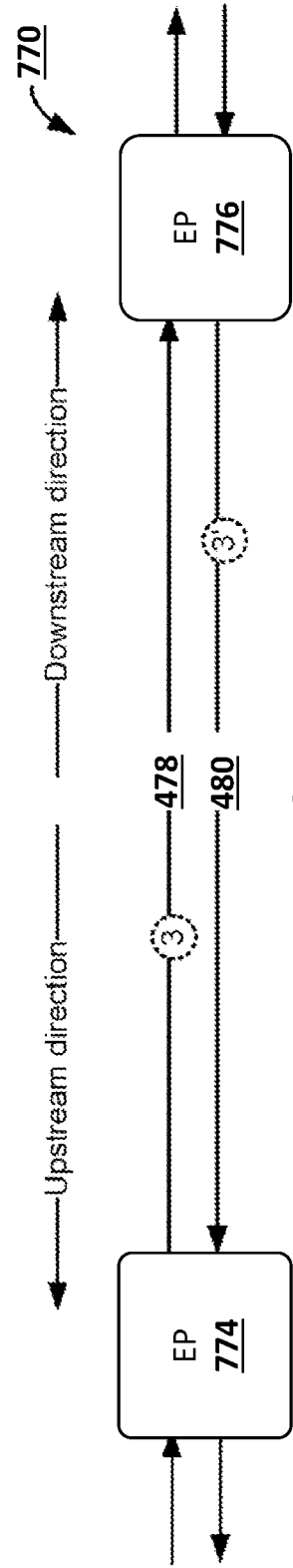

Thus, the "endpoints" referred to in FIGS. 7A-Z can be managed endpoints or UUD endpoints represented by agents (e.g., with an agent transmitting requests and receiving responses on the UUD endpoint).

FIGS. 7A-7D illustrate how an endpoint 702 becomes connected to the management service 110. In some embodiments, when endpoint 702 first joins the managed network, endpoint 702 notifies management service 110 that it has joined the network. In some embodiments, endpoint 702 notifies management service 110 through a registration message sent to management service 110—or, more precisely, to the linear chain interface 115 of the management service 110. In some embodiments, the registration message includes a respective unique identifier (e.g., network address or another type of unique identifier) of endpoint 702. In general, management service 110 and endpoints in the network are aware of how to sort the particular type of unique identifiers provided by the endpoints in a linear sequence. For example, the management service would recognize that the IP address 172.16.254.1 precedes the IP address 172.16.254.4. For another example, a management service may implement an ordering system (e.g., a unique identifier 12345 precedes another unique identifier 12346) for a particular type of unique identifiers (e.g., a set of five digit serial numbers), where each endpoint in the network has been assigned one of such unique identifiers. In some embodiments, other numbering or sequencing schemes are possible, as long as the numbering or sequencing scheme is known to the endpoints in the network and remains relatively stable over time.

Referring to FIG. 7A, in some implementations, endpoint 702 sends a registration message including its network address or other unique identifier. As is shown in FIG. 7B, in response to the registration message received from endpoint 702, management service 110 sends to endpoint 702 a list of potential neighbor endpoints. Management service 110 determines the ordinal position of endpoint 702 in the linear communication chain based on the identifier of endpoint 702, and the identifiers of all other endpoints currently known to be live in the managed network. As will be shown later, the management service's knowledge does not have to be accurate or up to date at all times.

In some embodiments, management service 110 identifies multiple potential preceding neighbors for endpoint 702 and multiple potential succeeding neighbors for endpoint 702. This redundancy is desirable since some of these endpoints may have gone offline between the time that they last reported to management service 110 and the time that endpoint 702 tries to contact them to join the linear communication chain. In some embodiments, when the unique identifiers used by management service 110 to order the endpoints in the network are the network addresses of the endpoints (e.g., the IP addresses), management service 110 provides 20 nearest preceding IP addresses and 20 nearest succeeding IP addresses relative to the IP address of endpoint 702. In some embodiments, management service 110 does not determine whether an IP address is associated with a live endpoint or not, and endpoint 702 verifies whether a particular IP address is live (i.e., is associated with a live endpoint) by contacting the endpoint at that IP address directly. In some embodiments, management service 110 provides other types of information (e.g., media access control addresses, also called MAC addresses) to endpoint 702, and endpoint 702 uses that information to find the contact information of its potential preceding neighbors and potential succeeding neighbors.

As shown in FIG. 7C, when endpoint 702 first joins the network, endpoint 702 also proceeds to establish a forward connection 706 and a backward connection 708 to management service 110. Management service 110 then uses forward connection 706 to provide information and send queries to endpoint 702, and uses backward connection 708 to collect information or receive reports from endpoint 702. Once the connections are established, endpoint 702 is joined to the network, but is not yet part of any linear communication chain.

In some embodiments, as shown in FIG. 7C, upon receiving the list of potential neighbors from management service 110, endpoint 702 proceeds to reach out to potential neighbor endpoints in the order provided by the management service in each direction (i.e., the upstream direction and the downstream direction) until a potential neighbor endpoint responds or all the potential neighbor endpoints are exhausted in that direction.

In most scenarios, endpoint 702 will find a live neighbor endpoint after one or more attempts to locate the nearest live potential neighbor endpoint in the list. If no live neighbor is found in the upstream direction, but a nearest live neighbor is found in the downstream direction, endpoint 702 will become a new head endpoint of a linear communication chain containing the downstream neighbor. If no live neighbor is found in the downstream direction, but a nearest live neighbor is found in the upstream direction, endpoint 702 will become a new tail endpoint of a linear communication chain containing the upstream neighbor. If no live neighbor is found in neither the upstream nor the downstream direction, endpoint 702 will remain a singleton communicating only with management service 110, as shown in FIG. 7D. If subsequently, another new endpoint that has nearest identifier to endpoint 702 joins the network, the new endpoint will take the same actions as endpoint 702 has done, and ultimately make contact with endpoint 702 to form a segment of a new linear communication chain.

FIGS. 7E-7J illustrate how a new endpoint (e.g., endpoint 712) is incorporated into an existing linear communication chain (e.g., linear communication chain 710) and becomes the new head endpoint of the linear communication chain.

As shown in FIG. 7E, new endpoint 712 joins the network and, as described above, obtains the list of potential neighbor nodes, e.g., by sending a registration message to management service 110. The list of potential neighbor nodes includes potential preceding neighbor nodes and potential succeeding neighbor nodes. New endpoint 712 goes down the list in both the upstream direction and the downstream direction to find its nearest live preceding node and its nearest live succeeding node. In this particular example, none of the potential upstream neighbor nodes responded to the contact from new endpoint 712, e.g., either because they are no longer active in the network, or there is a firewall separating them from new endpoint 712. Suppose that the nearest live downstream node that responded to new endpoint 712 is the current head endpoint 714 of the existing linear communication chain 710. New endpoint 712 will replace endpoint 714 in its role and become the new head endpoint of linear communication chain 710. As shown in FIG. 7E, the current head endpoint (i.e., endpoint 714) has a forward connection 718 and a backward connection 720 established between sever 110 and endpoint 714. In addition, new endpoint 712 has also established a forward connection 722 and a backward connection 724 between management service 110 and new endpoint 712 when it first joined the network. In some embodiments, the process to insert new endpoint 712 proceeds as follows.

In some embodiments, as shown in FIG. 7E, the first live downstream neighbor that responded to the contact from new endpoint 712 is endpoint 714. Once new endpoint 712 confirms that its closest live downstream neighbor in the network is endpoint 714, it proceeds to open a forward communication channel (e.g., forward communication channel 716) from new endpoint 712 to the existing head endpoint (i.e., endpoint 714). In some embodiments, a rule implemented by all endpoints in the network is to always proactively open a forward connection to its nearest live succeeding node (i.e., its downstream neighbor) when such a node is discovered in the network and there isn't already such a connection in place.

As shown in FIG. 7F, forward communication channel 716 has been established from new endpoint 712 to existing head endpoint 714. Forward communication channel 716 will serve as the propagation channel for new endpoint 712 (and as the new receiving channel for endpoint 714) to provide information to endpoint 714. Any information that needs to be propagated from management service 110 to endpoint 714 can now be propagated either through new endpoint 712 (e.g., through new receiving channel 716 of endpoint 714) or to endpoint 714 directly from the management service (e.g., through existing receiving channel 718 of endpoint 714).

Now the endpoint 714 has two receiving channels. Upon detecting that a preceding node (e.g., endpoint 712) has established a forward connection to itself, endpoint 714 proceeds to terminate the existing forward connection leading from management service 110 to endpoint 714, as shown in FIG. 7G. In some embodiments, a node does not proactively terminate a duplicate receiving channel unless it is a current head endpoint.

As shown in FIG. 7H, the existing receiving channel 718 of endpoint 714 has been terminated by endpoint 714. Endpoint 714 now relies solely on new endpoint 712 to provide system, security and network management information through new receiving channel 716 of endpoint 714 (i.e., propagation channel 716 of new endpoint 712). At this point, new endpoint 712 is not yet fully inserted into linear communication chain 710, since it still has not established a collection channel. Endpoint 714 continues to serve as the head endpoint of linear communication chain 710, and is responsible for returning information received from the rest of the linear communication chain to management service 110 through its existing reporting channel 720.

In the next stage, endpoint 714 detects that there is another live endpoint having a lower ordinal position than itself present in the network, and that this endpoint is its upstream neighbor in the linear communication chain 710. In some embodiments, endpoint 714 discovers endpoint 712 by periodically registering with management service 110 with a registration message, and in return receives a list of potential neighbor nodes in both directions. In some embodiments, endpoint 714 discovers endpoint 712 when new endpoint 712 makes the initial contact with endpoint 714. In this example, endpoint 714 discovers that it should no longer remain as the head endpoint of linear communication chain 710, and that its new upstream neighbor node is new endpoint 712. Upon the discovery that new endpoint 712 is a live upstream neighbor and that there is no existing backward communication channel between endpoint 714 and new endpoint 712, endpoint 714 proceeds to open a new backward communication channel (e.g., backward communication channel 726) from endpoint 714 to new endpoint 712, as shown in FIG. 7H. In some embodiments, a rule implemented by all endpoints in the network is to always proactively open a backward communication channel to the nearest live preceding node (i.e., its upstream neighbor) when such a node is discovered in the network and there isn't already such a communication channel in place.

As shown in FIG. 7H, new backward communication channel 726 will serve as the new reporting channel of endpoint 714 and the collection channel of new endpoint 712. At this point, endpoint 714 can report back to management service 110 either directly through its existing reporting channel 720 or through new reporting channel 726. New endpoint 712 is now fully functional within linear communication chain 710 as the new head endpoint of linear communication chain 710.

Since endpoint 714 now has duplicate reporting channels (one channel to new endpoint 712 and the other channel directly back to management service 110), endpoint 714 proceeds to terminate the old reporting channel 720 back to management service 110, as shown in FIG. 7I. In some embodiments, a node always proactively terminates an old, duplicate reporting channel when a new reporting channel has been established. As shown in FIG. 7J, after having terminated the old reporting channel 720 to management service 110, endpoint 714 has fully changed its role from being the head endpoint of linear communication channel 710 to being an intermediate node of linear communication chain 710.

As shown in FIG. 7J, in a steady state, new endpoint 712 serves as the new head endpoint of linear communication chain 710. New endpoint 712 receives information from management service 110 through its receiving channel 722 leading from management service 110 to endpoint 712. New endpoint 712 forwards the information and any updates to endpoint 714 through its propagation channel 716 leading from new endpoint 712 to endpoint 714. The new intermediate node (i.e., endpoint 714) further processes and/or forwards the information downstream to the other nodes of linear communication chain 710. When endpoint 714 sends information upstream to new endpoint 712, new endpoint 712 receives the information through collection channel 726 of new endpoint 712. New endpoint 712 then sends the received information along with any local updates to management service 110 through reporting channel 724 of new endpoint 712.

In some embodiments, the management service 110 keeps an updated list of all the head endpoints in the network and sends those nodes a trigger to register as soon as it has new requests (for system and security management operations, etc.), thereby avoiding the delay inherent in the registration interval.

FIGS. 7E-7J illustrate the scenario for inserting a new head endpoint into an existing linear communication chain. FIGS. 7K-7P illustrate another scenario where a new tail endpoint is inserted into an existing linear communication chain.

As shown in FIG. 7K, a new endpoint (e.g., new endpoint 728) has joined the managed network and established forward connection 732 and backward connection 734 to management service 110. New endpoint 728 has also obtained a list of potential neighbor nodes, e.g., by sending a registration message to management service 110. The list of potential neighbor nodes includes potential preceding neighbor nodes and potential succeeding neighbor nodes for new endpoint 728. New endpoint 728 attempts to identify its nearest live preceding node and its nearest live succeeding node by contacting the list of nodes one by one in both the upstream direction and the downstream direction.

In this particular example, none of the potential succeeding neighbor nodes responded to the contact from new endpoint 728. The nearest live upstream node that responded to new endpoint 728 is the current tail endpoint 730 of existing linear communication chain 710. Tail endpoint 730 has a forward connection (e.g., forward connection 736) and a backward connection (e.g., backward connection 738) to management service 110. Tail endpoint 730 sends information to management service 110 through forward connection 736 and receives information from management service 110 through backward connection 738. In this example, since endpoint 730 has a lower ordinal position than new endpoint 728, new endpoint 728 will replace endpoint 730 in its role and become the new tail endpoint of linear communication chain 710. In some embodiments, the process for inserting new endpoint 728 proceeds as follows.

As shown in FIG. 7K, once new endpoint 728 confirms that its upstream neighbor (i.e., closest live preceding node) in the network is endpoint 730, it proceeds to open a backward communication channel (e.g., backward communication channel 740) from new endpoint 728 to endpoint 730. In some embodiments, a rule implemented by all endpoints in the network is to always proactively open a backward communication channel to a closest live preceding endpoint (i.e., an upstream neighbor) if such a preceding endpoint has been discovered and there isn't already such a communication channel in place.

As shown in FIG. 7L, backward communication channel 740 has been established from new endpoint 728 to existing tail endpoint 730. Backward communication channel 740 will serve as the reporting channel for new endpoint 728 (and a new collection channel for endpoint 730) to provide information to endpoint 730. Endpoint 730 now receives information in the upstream direction from both management service 110 and new endpoint 728.

Now, endpoint 730 has two collection channels, and it proceeds to terminate the old collection channel 738 between endpoint 730 and management service 110, as shown in FIG. 7M. In some embodiments, a node does not proactively terminate a duplicate collection channel unless it is a current tail endpoint. Once the old collection channel 738 has been terminated by endpoint 730, endpoint 730 relies solely on its newly established collection channel 740 to receive information in the upstream direction. At this point, new endpoint 728 is not yet fully inserted into linear communication chain 710, as it has not yet established a receiving channel.

In the next stage, endpoint 730 detects that a new endpoint (e.g., new endpoint 728) having the next higher ordinal position relative to itself has entered the network, and that new endpoint 728 should succeed it in linear communication chain 710. In some embodiments, endpoint 730 discovers endpoint 728 by periodically reporting to management service 110 with a registration message, and in return receives a list of potential neighbor nodes in both directions. In some embodiments, endpoint 730 discovers new endpoint 728 when new endpoint 728 makes the initial contact with endpoint 730.

Upon discovering that new endpoint 728 is its downstream neighbor in linear communication chain and a forward connection does not already exist between itself and new endpoint 728, endpoint 730 proceeds to open a new forward communication channel (e.g., forward communication channel 742) from endpoint 730 to new endpoint 728, as shown in FIG. 7N. New forward communication channel 742 will serve as the new propagation channel of endpoint 730 and the receiving channel of new endpoint 738. In some embodiments, a rule implemented by all endpoints in the network is to proactively open a forward communication channel to a closest live succeeding endpoint (i.e., downstream neighbor) if such a succeeding endpoint has been discovered and such a forward communication channel does not already exist.

At this point, endpoint 730 can propagate information downstream either directly through its existing propagation channel 736 or through new propagation channel 742. New endpoint 728 is now fully functional within linear communication chain 710 as the new tail endpoint of linear communication chain 710. Since endpoint 730 now has duplicate propagation channels (one channel to new endpoint 728 and another channel to management service 110), endpoint 730 proceeds to terminate the old propagation channel 736 connected to management service 110, as shown in FIG. 7O. In some embodiments, a node always proactively terminates an old, duplicate propagation channel when a new propagation channel has been established. After having terminated the old propagation channel 736 to management service 110, endpoint 730 has fully changed its role from being the tail endpoint of linear communication chain 710 to being an intermediate node of linear communication chain 710.

As shown in FIG. 7P, during a steady state, new endpoint 728 serves as the new tail endpoint of linear communication chain 710. New endpoint 728 receives information from endpoint 730 through its receiving channel 742 leading from endpoint 730 to endpoint 728. New endpoint 728 propagates the information and any updates to management service 110 through its propagation channel 734 leading from new endpoint 302 to management service 110. In the upstream direction, when new endpoint 728 receives information from management service 110 through its collection channel 732, new endpoint 728 sends the information upstream to endpoint 730 through reporting channel 740 of new endpoint 728. Endpoint 730, now serving as an intermediate node, further processes and/or forwards the information upstream to other nodes in linear communication chain 710.

In some embodiments, similar to the processes described above with respect to inserting a new head endpoint or a new tail endpoint into an existing linear communication chain, the insertion of a new intermediate node into the existing linear communication chain can be performed based on the same set of rules mentioned above. In general, an existing intermediate node that is having a new upstream neighbor node inserted behaves similarly to an existing head endpoint that is having a new head endpoint inserted. In general, an existing intermediate node that is having a new downstream neighbor node inserted behaves similarly to an existing tail endpoint that is having a new tail endpoint inserted. In general, when a new intermediate node is inserted between a pair of adjacent nodes in a linear communication chain, the actions taken by each node depends on the relative position of said node among the three nodes involved in the insertion. FIGS. 7Q-7V illustrate an example process for inserting a new endpoint (e.g., new endpoint 744) as an intermediate node in a linear communication chain (e.g., linear communication chain 710).

As shown in FIG. 7Q, new endpoint 744 has joined the managed network and established forward connection 746 and backward connection 748 between new endpoint 744 and management service 110. New endpoint 744 then obtains a respective list of potential neighbor nodes in both the upstream and the downstream directions. New endpoint 744 then attempts to make contact with its nearest live preceding node and nearest live succeeding node. In this particular example, a nearest live upstream node (e.g., endpoint 750) and a nearest live downstream node (e.g., endpoint 752) responded to new endpoint 744. Endpoint 750 and endpoint 752 are adjacent nodes in the existing linear communication chain 710. Based on the ordinal positions determined according to their respective unique identifiers (e.g., IP addresses), new endpoint 744 will be inserted as an intermediate node between endpoint 750 and endpoint 752. Although endpoints 750 and 752 are shown as intermediate nodes in the linear communication chain 710, the same process would apply when endpoint 750 is a head endpoint, and/or when endpoint 752 is a tail endpoint of an existing linear communication chain.

As shown in FIG. 7Q, once new endpoint 744 confirms that its downstream neighbor in the network is endpoint 752, endpoint 744 proceeds to open a forward communication channel (e.g., forward communication channel 758) from new endpoint 744 to endpoint 752. In some embodiments, a rule implemented by all endpoints in the network (and here independently applied by new endpoint 744) is to proactively open a forward communication channel to a downstream neighbor when such downstream neighbor has been discovered and such channel does not already exist.

As further shown in FIG. 7Q, once new endpoint 744 confirms that its upstream neighbor in the network is endpoint 750, it proceeds to open a backward communication channel (e.g., backward communication channel 760) from new endpoint 744 to endpoint 750. In some embodiments, a rule implemented by all endpoints in the network (and here independently applied by new endpoint 744) is to proactively open a backward communication channel to an upstream neighbor when such upstream neighbor has been discovered and such channel does not already exist. In some embodiments, each endpoint always opens a forward connection to its downstream neighbor before it opens a backward connection to its upstream neighbor.

As shown in FIG. 7R, new endpoint 744 has already opened forward communication channel 758 to its downstream neighbor 752, and backward communication channel 760 to its upstream neighbor 750. Forward communication channel 758 will serve as a propagation channel for new endpoint 744 and a new receiving channel for endpoint 752. Backward communication channel 760 will serve as a reporting channel for new endpoint 744 and a new collection channel for endpoint 750.

As shown in FIG. 7S, new endpoint 744 now has two propagation channels, an old propagation channel 748 to management service 110, and a new propagation channel 758. New endpoint 744 proceeds to terminate the old propagation channel 748 to management service 110. As shown in FIG. 7T, after new endpoint 744 has terminated the old propagation channel 748, new endpoint 744 sends information in the downstream direction through its new propagation channel 758.

As shown in FIG. 7S, after new endpoint 744 has established backward communication channel 760 to endpoint 750, endpoint 750 receives information in the upstream direction through two collection channels 756 and 760. Even though endpoint 750 now has two collection channels, it does not actively terminate the old collection channel 756. Instead, endpoint 750 relies on its former successor node 752 to terminate the backward communication channel 756. In some embodiments, a rule implemented by all endpoints is to terminate a redundant reporting channel leading to an old non-management service predecessor node, but not a redundant collection channel leading from an old non-management service successor node.

As shown in FIG. 7T, when endpoint 752 discovers that new endpoint 744 is now its new upstream neighbor, endpoint 752 proceeds to open a backward communication channel (e.g., backward communication channel 762) to new endpoint 744. Backward communication channel 762 will serve as the collection channel for new endpoint 744 to receive information from endpoint 752. Backward communication channel 762 also serves as a new reporting channel for endpoint 752 to send information to new endpoint 744. As shown in FIG. 7T, endpoint 752 now has two backward communication channels, one channel 756 to its old upstream neighbor 750 and another channel 762 to its new upstream neighbor 744. Based on the rules implemented by all endpoints and here independently applied by endpoint 752, endpoint 752 proceeds to terminate the backward communication channel 756 to its previous upstream neighbor 750.

As shown in FIG. 7U, after endpoint 750 discovers that new endpoint 744 is its new downstream neighbor in linear communication chain 710, endpoint 750 proceeds to open new forward communication channel 764 from endpoint 750 to new endpoint 744. New forward communication channel 764 will serve as the new propagation channel of endpoint 750, and the receiving channel of new endpoint 744. At this point, endpoint 750 can send information in the downstream direction to endpoint 752 through its existing propagation channel 754 and to new endpoint 744 through its new propagation channel 764.

Since endpoint 750 now has a redundant propagation channel, endpoint 750 proceeds to terminate the old propagation channel 754 to endpoint 752, as shown in FIG. 7U. In some embodiments, a rule implemented by all endpoints and here independently applied by endpoint 750 is to terminate an old forward communication channel to a previous downstream neighbor, when a new forward communication channel to a new downstream neighbor has been established.

When endpoint 750 has established forward communication channel 764 to new endpoint 744, and endpoint 752 has established backward communication channel 762 to new endpoint 744, the local segment centered about new endpoint 744 is completely established. At this point, new endpoint 744 proceeds to terminate forward communication channel 746 from management service 110. Once forward communication channel 746 has been terminated, new endpoint 744 is completely inserted into linear communication chain 710 and becomes an intermediate node in linear communication chain 710, as shown in FIG. 7V.

During a steady state, new endpoint 744 serves as a new intermediate node between endpoint 750 and endpoint 752. New endpoint 744 receives information from endpoint 750 through its receiving channel 764 leading from endpoint 750 to new endpoint 744. New endpoint sends the received information and any updates to endpoint 752 through its propagation channel 758 leading from new endpoint 744 to endpoint 752. When propagating information in the upstream direction, new endpoint 744 receives information from endpoint 752 through its collection channel 762 leading from endpoint 752 to new endpoint 744. New endpoint 744 then sends the received information upstream to endpoint 750 through its reporting channel 760 leading from new endpoint 744 to endpoint 750.

As described above, new endpoint 744 and existing endpoints 750 and 752 implement the same set of rules to independently determine their respective positions in the linear communication chain, identify their respective upstream and downstream neighbors in the linear communication chain, establish new communication channels to their new upstream and/or downstream neighbors, and drop old, duplicate communication channels to their old upstream and/or downstream neighbors. The independent actions of endpoints 744, 750, and 752 are coordinated on a global scale simply by the design of the rules. As a result of the coordination, a simple linear communication chain is created and maintained for transport information, instructions, and updates to and from all endpoints in the network in a full-duplex manner.

FIGS. 7A-7V illustrate only some exemplary processes for updating a linear chain. The rules implemented by the endpoints can be modified in various embodiments. A general requirement for the rules is that each node in the network only terminates an existing communication channel when it has established another communication channel of the same type. In addition, each node only proactively terminates two types of communication channels, and relies on its neighbors to terminate the other two types of communication channels. This additional requirement ensures that there is symmetry in the actions of the nodes and that the independent actions of neighboring nodes are coordinated in the end to form a complete local segment of the linear communication chain. In some embodiments, it takes only a few milliseconds to establish the communication channels and insert a new node into the linear communication channel. As a result, there is virtually no downtime of system, security and network management communication during the insertion of a new node into the network.

FIGS. 7W-7Z illustrate a process for self-repair or self-healing of a linear communication chain (e.g., linear communication chain 710) when one or more intermediate nodes (e.g., endpoint 772) ceases to respond to communications from its upstream neighbor (e.g., endpoint 774) and its downstream neighbor (e.g., endpoint 776).

In general, when one or more consecutive intermediate nodes of a linear communication chain exit the managed network (e.g., due to failure or otherwise), a gap is created in the linear communication chain, and the communications going upstream and downstream the linear communication chain are blocked at the gap. In some embodiments, each node in the linear communication chain implements a rule to periodically check whether its current upstream and downstream neighbors are still responsive. In some embodiments, if a node discovers that its current downstream neighbor is no longer responsive, the node tries to establish communication with the next live downstream node to repair the linear communication chain. Similarly, if a node discovers that its current upstream neighbor is no longer responsive, the node tries to establish communication with the next live upstream node to repair the linear communication chain. In some embodiments, the repair process proceeds as follows.

As shown in FIG. 7W, endpoints 774, 772, and 776 form a contiguous segment of linear communication chain 770 in a managed network. The ordinal positions of endpoints 774, 772, and 776 in linear communication chain 770 have been determined based on the sequential order of their respective unique identifiers (e.g., IP addresses) among all the currently known endpoints in the managed network. According to their respective identifiers, endpoint 776 is the current downstream neighbor for endpoint 772, endpoint 774 is the current upstream neighbor for endpoint 772. FIG. 7W shows that all endpoints are live and functional, and there is a pair of active communication channels supporting full duplex communications between each pair of endpoints. Specifically, forward communication channel 778 and backward communication channel 780 have been established between endpoint 774 and endpoint 772, and forward communication channel 782 and backward communication channel 784 have been established between endpoint 772 and endpoint 776. In other words, the segment of linear communication chain 770 is contiguous and functional.

FIG. 7X illustrates that endpoint 772 has exited the network (e.g., either voluntarily or due to equipment or network failure). As a result, communication channels 778 and 780 between endpoints 774 and 772 as well as communication channels 782 and 784 between endpoints 772 and 776 are no longer functional. In some embodiments, each endpoint (including endpoints 774 and 776) independently pings its upstream and downstream neighbor nodes periodically to check whether these nodes are still responsive. In some embodiments, endpoints 774 and 776 continue to ping endpoint 772 with increasing time intervals, in case endpoint 772 becomes responsive again after a while.

In some embodiments, after failing to reach its downstream neighbor 772, endpoint 774 proactively closes forward communication channel 778 and backward communication channel 780 (e.g., reclaim the ports and other resources used for these channels). Similarly, after failing to reach its upstream neighbor 772, endpoint 776 proactively closes forward communication channel 782 and backward communication channel 784. In some embodiments, endpoints 774 and 776 do not proactively close any communication channel until they have established a replacement communication channel with a newly discovered neighbor node. In some embodiments, if endpoint 772 does become responsive again after a while, endpoints 774 and 776 restore the communication channels that have been proactively terminated.

FIG. 7Y illustrates that, in some embodiments, after endpoints 774 and 776 independently discover that endpoint 772 has exited the network, endpoints 774 and 776 independently contact management service 110 to obtain respective lists of potential neighbor nodes, e.g., by submitting respective registration messages to management service 110. In some embodiments, endpoints 774 and 776 only register with management service 110 periodically, and if the time for registering with management service 110 has not arrived, endpoints 774 and 776 simply use their respective list of potential neighbors they previously received from management service 110.

FIG. 7Z illustrates that endpoint 774 goes down its respective list of potential neighbors one by one in the downstream direction until a live downstream node is found. In this case, after endpoint 772 has exited the network, endpoint 776 becomes the nearest live downstream neighbor for endpoint 774. Once endpoint 774 has made contact with endpoint 776 and confirmed that endpoint 776 is its new downstream neighbor, endpoint 774 proceeds to open forward communication channel 778 from endpoint 774 to endpoint 776, as shown in FIG. 7Z. Forward communication channel 778 will serve as a new propagation channel for endpoint 774 and a new receiving channel for endpoint 776. In some cases, more than one consecutive downstream node of endpoint 774 may have exited the network without the knowledge of management service 110. In such cases, endpoint 774 may try to contact one or more failed nodes before reaching its closest live downstream node.

Also illustrated in FIG. 7Z, independently of the actions of endpoint 774, endpoint 776 goes down its list of potential neighbors one by one in the upstream direction until a closest live upstream node is found. In this case, after endpoint 772 has exited the network, endpoint 774 becomes the nearest live upstream node to endpoint 776. Once endpoint 776 has made contact with endpoint 774 and confirmed that endpoint 774 is its new upstream neighbor, endpoint 776 proceeds to open backward communication channel 780 from endpoint 776 to endpoint 774, as shown in FIG. 7Z. Backward communication channel 780 will serve as a new reporting channel for endpoint 776 and a new collection channel for endpoint 774. In some cases, more than one consecutive upstream node of endpoint 776 may have exited the network without the knowledge of management service 110. In such cases, endpoint 776 may try to contact one or more failed nodes before reaching its closest live upstream node.

As shown in FIG. 7Z, once both endpoints 774 and 776 have established a new connection to each other, the repair of linear communication chain 770 is completed. Full-duplex communication upstream and downstream of linear communication chain 770 is restored.

The endpoints described above with respect to FIGS. 7A-7Z may be managed endpoints 100A-D (i.e., endpoints with installed management software), endpoint proxies (EPPs) 202A-E of VLCs 125A managed by agents 120A, or various combinations thereof. For example, the same set of operations may be performed to maintain a given linear chain, regardless of the types of endpoints in the linear chain or the types of endpoints being added or removed from the linear chain. FIGS. 7A-7Z are merely illustrative of how endpoints may communicate with one another to set up respective local segments of the linear communication chain around themselves, and that the particular set of rules used to by the endpoints to establish the linear communication chain may vary from embodiment to embodiment.

The embodiments of the invention described herein provide numerous benefits over existing implementations. By way of example, and not limitation, these embodiments provide proxies for UUD endpoints which cannot natively host a management client (e.g., using a physical machine as a proxy for one or more UUD endpoints). In some implementations, a virtual machine running on the physical machine acts as a proxy for one or more UUD endpoints. Alternatively, or additionally, containers (Docker, Kubernetes) which impose very little overhead, are configured on the physical machine to perform the proxy functions for the one or more UUD endpoints.

To improve the latency of queries from the endpoint management service, a back-end database is deployed and independent agents running on the proxy nodes that poll the UUD endpoints and populate the database rows with their responses. The proxy nodes, in turn, query the database rather than the UUD endpoints respective APIs or downstream connections.

To simulate more than one node, such as a proxy node representing multiple endpoint nodes, the proxy node is assigned multiple IP addresses which it uses to represent separate UUD (e.g., a separate IP address for each UUD), effectively mapping a separate persona to each IP address. To simulate a collection of nodes, one or more virtual machines that emulate those nodes can be hosted in the cloud.

To simulate a collection of nodes managed by an endpoint management system which uses a linear chain interface, the simulating node can be assigned two actual IP addresses, representing the "front-end" and "back-end" nodes in the linear chain, and emulate the behavior of the nodes in between, reporting what the management server needs to see to treat it as a linear chain of endpoints. In one embodiment, the intermediate "nodes" represented by database rows can "talk" directly to the management server by using a NAT layer and provisioning non-routable addresses for the rows/nodes in between the front-end and back-end.

Various terms related to services, interfaces, and endpoints are used throughout this detailed description. For the sake of clarify, the following terms have the following meanings:

A direct endpoint connect (DEC) interface is an interface of a server to communicate with various devices individually, which can send out queries on demand and send out queries periodically and store results.

An external service (ES) interface or external repository interface (ERI) is an interface to communicate with an external service which manages a certain type of UUD endpoints (e.g., OT devices, IoT devices) and which may maintain a repository of data related to these UUD endpoints. This includes an interface of the server to communicate with the API of the other service (e.g., an OT service, IoT service, etc) to collect UUD endpoint data and/or a database interface of the server to communicate with the external repository of data maintained by the other service, irrespective of how the external service collected the data (e.g., via calls to the API of another party).

A linear chain (LC) (also referred to as a "linear orbit") is a set of interconnected managed endpoint devices (i.e., with an installed management client) and can also include one or more virtual linear chains of unmanageable endpoints (without a management client), which participate in the linear chain protocol. A given linear chain can include only managed endpoints, a combination of managed endpoints and VLCs, or only VLCs.

A virtual linear chain (VLC) is a virtual representation of unmanaged endpoint devices participating in a linear chain to allow the unmanaged endpoint devices to be managed through a linear chain interface. A VLC may be generated by agents running on one or more electronic devices and can include virtual machines. The agents can access data of the unmanaged endpoint devices through an external service API (e.g., an external service interface) or directly using the interfaces/protocols supported by the unmanaged devices.

A linear chain interface (LCI) is an interface of a server designed to communicate with linear chains in accordance with a linear chain protocol.

A management client is client software installed on an endpoint to cause it to participate in a particular management protocol; a linear chain (LC) client is one example of a management client when using a linear chain architecture.

Example Electronic Devices and Environments

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, endpoints, or end user devices; or more specifically referred to as mobile devices, desktops, desktop computers, workstations, laptops, personal digital assistants, smartphones, wearables, augmented reality (AR) devices, virtual reality (VR) devices, mixed reality (MR) devices, embedded devices, Internet-of-Things devices (e.g., cameras, lighting, refrigerators, security systems, smart speakers, and thermostats), etc. The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 8A:
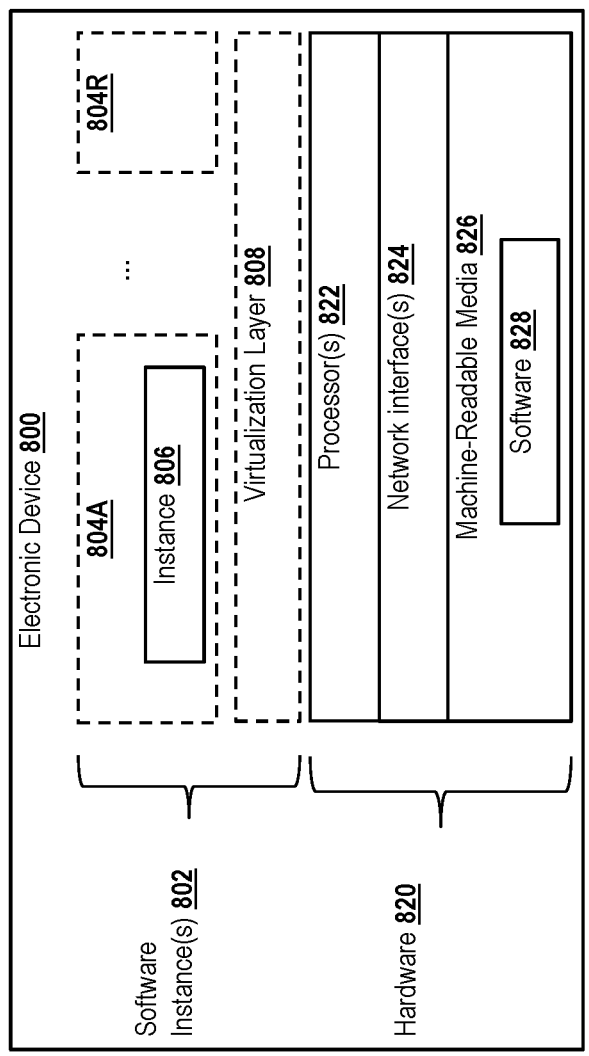
FIG. 8A illustrates an example electronic device on which embodiments of the invention may be implemented.

FIG. 8A is a block diagram illustrating an electronic device 800 according to some example embodiments. FIG. 8A includes hardware 820 comprising a set of one or more processor(s) 822, a set of one or more network interfaces 824 (wireless and/or wired), and machine-readable media 826 having stored therein software 828 (which includes instructions executable by the set of one or more processor(s) 822). The machine-readable media 826 may include non-transitory and/or transitory machine-readable media. In the electronic devices 886 of FIG. 1 that include client software (e.g., the above-described client software 192 and/or the below-described client software 888), the software 828 represents that software. In electronic devices used to implement the cloud service(s) 842, the software 828 represents the software to implement the cloud service(s) 842.

During operation, an instance of the software 828 (illustrated as instance 806 and referred to as a software instance; and in the more specific case of an application, as an application instance) is executed. In electronic devices that use compute virtualization, the set of one or more processor(s) 822 typically execute software to instantiate a virtualization layer 808 and one or more software container(s) 804A-804R (e.g., with operating system-level virtualization, the virtualization layer 808 may represent a container engine (such as Docker Engine by Docker, Inc. or rkt in Container Linux by Red Hat, Inc.) running on top of (or integrated into) an operating system, and it allows for the creation of multiple software containers 804A-804R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-804R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 828 is executed within the software container 804A on the virtualization layer 808. In electronic devices where compute virtualization is not used, the instance 806 on top of a host operating system is executed on the "bare metal" electronic device 800. The instantiation of the instance 806, as well as the virtualization layer 808 and software containers 804A-804R if implemented, are collectively referred to as software instance(s) 802.

Alternative embodiments of an electronic device may have numerous variations from that described above. For example, customized hardware and/or accelerators might also be used in an electronic device.

Figure 8B:
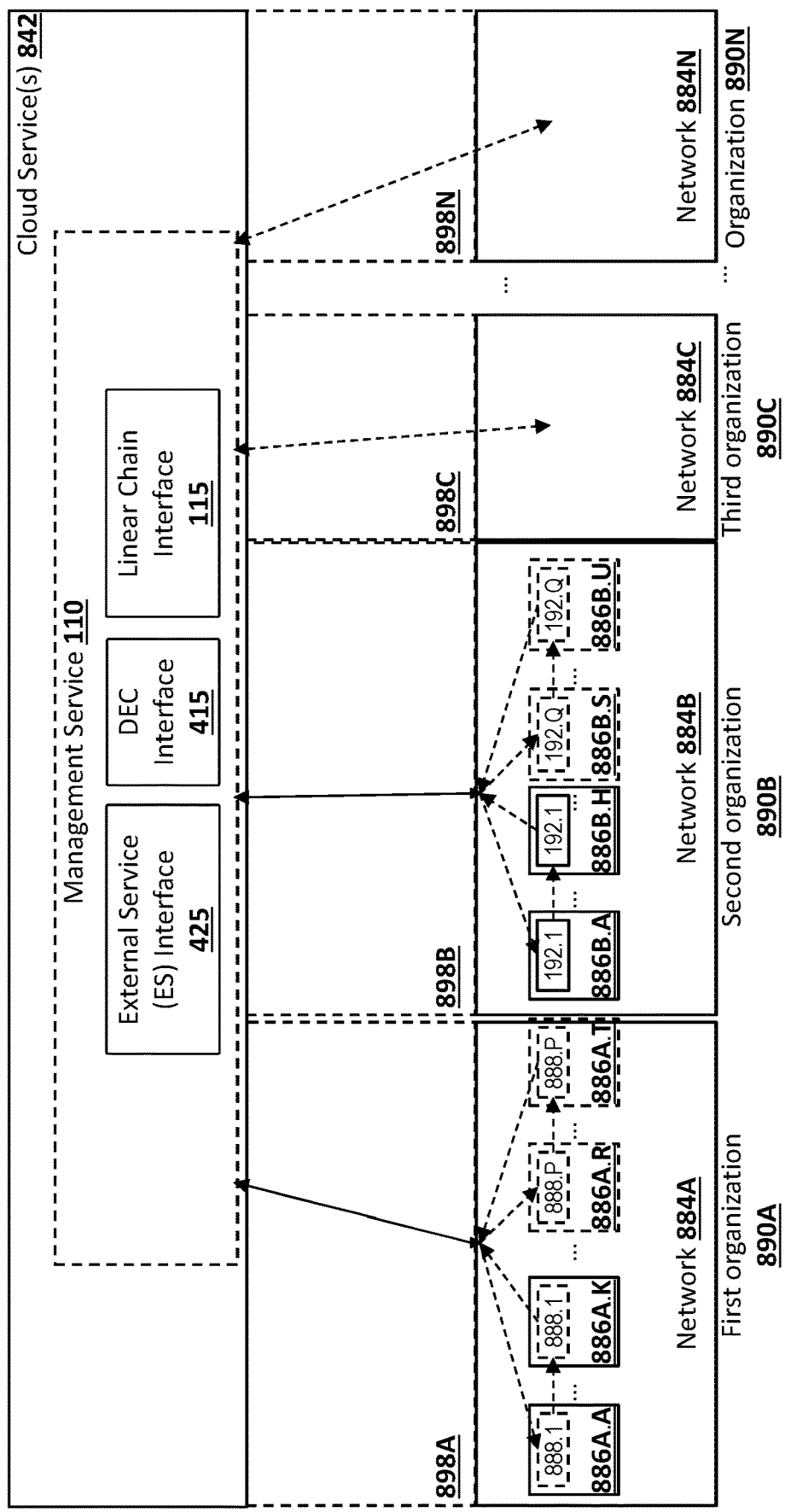
FIG. 8B illustrates an implementation in which cloud services, including a management service, is used by different organizations.

FIG. 8B is a block diagram of a deployment environment according to some example embodiments. Hardware (e.g., a set of one or more server devices) and software provide cloud service(s) 842 which can include an implementation of the management service 110 described herein. In some embodiments, this hardware and software are in one or more datacenter(s). These datacenter(s) may be: 1) first party datacenter(s), which are datacenter(s) owned and/or operated by the same entity that provides and/or operates some or all of the software that provides the cloud service(s) 842; and/or 2) third-party datacenter(s), which are datacenter(s) owned and/or operated by one or more different entities than the entity that provides the cloud service(s) 842 (e.g., the different entities may host some or all of the software provided and/or operated by the entity that provides the cloud service(s) 842). For example, third-party datacenters may be owned and/or operated by entities providing public cloud services (e.g., Amazon.com, Inc. (Amazon Web Services), Google LLC (Google Cloud Platform), Microsoft Corporation (Azure)).

While the management service 110 implements the services previously described herein, some embodiments support additional services such as: endpoint discovery and inventory (also known as endpoint mapping); client management (including one or more of bare metal provisioning of new system and patching); monitoring activity in real time and reporting potential malicious behavior; identifying sensitive files on endpoints when they shouldn't be there (including looking inside of files); and threat hunting.

A user of an electronic device within or outside one of the networks 884 may communicate with the cloud service(s) 842 using TCP/IP (Transfer Control Protocol and Internet Protocol) and, at a higher network level, use other networking protocols to communicate, such as Hypertext Transfer Protocol (HTTP), a remote procedure call (RPC) framework (e.g., gRCP), an application program interface (API) based upon protocols such as Representational State Transfer (REST), etc. In an example where HTTP is used, an HTTP client, commonly referred to as a "browser," may be used on an electronic device to communicate HTTP messages with the cloud service(s) 842, thus allowing a user to access, process, and view information via pages and applications provided as part of the cloud service(s) 842, including allowing a user to interact with various GUI pages provided by the cloud service(s) 842.

Most, if not all, of the elements from FIG. 1 are implemented within the architecture of FIG. 8B. Thus, the description will focus on those that are not in FIG. 1. For instance, FIG. 8B illustrates a variety of additional aspects and relationships that may exist between the organizations 890 and the cloud service(s) 842. To express these, FIG. 8B shows additional organizations 890, including a third organization 890C followed by " . . . " to an organization 890N. There is a respective network 884 and area 898 for each (e.g., the third organization 890C has associated with it a network 884C and an area 898C). Each of the areas 898x represents one or more of the agents (e.g., agents 120A-B) and/or intermediary devices (e.g., intermediary devices 520, 540) described herein to couple endpoints (e.g., electronic devices 886A.A-886A.T, electronic devices 886B.A-886B.T, etc) to the management service 110 (e.g., via the linear chain interface 115 and DEC interface 415).

The provider of the client software 192.x and/or the cloud service(s) 842, such as management service 110, may provide client software to one or more of the organizations 890 for that organization to analyze the electronic devices (e.g., endpoints) within its own network. Specifically, client software 888.x may be provided to the first organization 890A for that organization to analyze the electronic devices 886A.A-886A.T on the network 884A (where the x in 888.x distinguishes which linear chain in embodiments in which the linear chain approach is used) and client software 192.x may be provided to the second organization 890B for that organization to analyze the electronic devices 886B.A-886B.T on the network 884B.

Limits are imposed by the management service 110 and other cloud services 842 on the information of the second organization 890B shared with the first organization 890A and other organizations 890C-N. That is, the services offered by the management service 110 may be partitioned so that while the management service 110 can access client software running on endpoints in all of the organizations 890A-N, each individual organization only has access to the data of its own client endpoints.

CONCLUSION

In the above description, numerous specific details such as resource partitioning/sharing/duplication embodiments, types and interrelationships of system components, and logic partitioning/integration choices are set forth to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, and/or characteristic is described in connection with an embodiment, one skilled in the art would know to affect such feature, structure, and/or characteristic in connection with other embodiments whether explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

What is claimed is:

1. A non-transitory machine-readable storage medium that provides instructions that, if executed by a set of one or more processors, are configurable to cause said set of one or more processors to perform operations comprising:
   establishing a connection with a management service in accordance with a linear chain protocol, the linear chain protocol to operate, at least in part, based on a linear chain comprising a plurality of managed endpoint devices, the linear chain to collectively process requests from the management service by aggregating data using interconnections between the plurality of managed endpoint devices;
   receiving endpoint data for an unmanageable endpoint device, the unmanageable endpoint device incapable of directly participating in the management protocol;
   receiving, from the linear chain, a linear chain request via the management protocol for the unmanageable endpoint device;
   determining a response to the linear chain request using the endpoint data; and
   sending, to the linear chain, via the management protocol, the response using a virtual representation of the unmanageable endpoint device, wherein using the virtual representation comprises mimicking participation by the unmanageable endpoint device in the linear chain.

2. The non-transitory machine-readable medium of claim 1, wherein establishing the connection with the management service comprises indicating a first network address to receive management service requests and indicating a second network address from which to transmit management service responses.

3. The non-transitory machine-readable medium of claim 2, wherein the first network address is associated with a first virtual representation of a first unmanageable endpoint device and the second network address is associated with a second virtual representation of a second unmanageable endpoint device, wherein a plurality of network addresses with numerical values between the first network address and the second network addresses are associated with a corresponding plurality of virtual representations of unmanageable endpoint devices.

4. The non-transitory machine-readable medium of claim 3, wherein a virtual linear chain of unmanageable endpoint devices is formed with the first virtual representation, the corresponding plurality of virtual representations, and the second virtual representation, the first virtual representation configured as a front-end endpoint of the virtual linear chain configured to receive requests from the management service and the second virtual representation configured as a back-end endpoint of the virtual linear chain configured to transmit responses to the management service, the responses containing data aggregated from the first virtual representation, the corresponding plurality of virtual representations, and the second virtual representation.

5. The non-transitory machine-readable medium of claim 1, wherein receiving the endpoint data comprises requesting particular types of endpoint data based on requests received from the management service, the particular types of endpoint data requested directly from the unmanageable endpoint device and/or from an external data store containing the particular types of endpoint data or portions thereof.

6. The non-transitory machine-readable medium of claim 1, wherein a data structure comprising a plurality of entries is to provide virtual representations of a plurality of unmanageable endpoint devices including the virtual representation of the unmanageable endpoint device, each entry configurable to store at least a portion of the endpoint data associated with a corresponding unmanageable endpoint, the entry to be accessed to provide the corresponding virtual representation.

7. The non-transitory machine-readable medium of claim 6, wherein the data structure comprises a table and the entries comprise rows of the table.

8. The non-transitory machine-readable medium of claim 6, including instructions that, if executed by the set of one or more processors, are configurable to cause the set of one or more processors to perform additional operations comprising:
   searching the data structure to locate an entry associated with a first unmanageable endpoint device responsive to a management service request for a first set of data associated with the first unmanageable endpoint device,
   reading the first set of data from the entry,
   generating a response message including the first set of data, and
   transmitting the response message to the management service.

9. The non-transitory machine-readable medium of claim 1, including instructions that, if executed by the set of one or more processors, are configurable to cause the set of one or more processors to perform additional operations comprising:
   storing the endpoint data for the unmanageable endpoint device in a local data store; and
   querying the local data store to access the endpoint data, or portions thereof, in response to requests from the management service.

10. The non-transitory machine-readable medium of claim 1, wherein a virtual machine is to provide the virtual representation of the unmanageable endpoint device.

11. The non-transitory machine-readable medium of claim 1, wherein the virtual representation of the unmanageable endpoint device comprises a virtual machine configured as a proxy for the unmanageable endpoint device.

12. A method performed responsive to execution of program code by one or more processors, the method comprising:
   establishing a connection with a management service in accordance with a linear chain protocol, the linear chain protocol to operate, at least in part, based on a linear chain comprising a plurality of managed endpoint devices, the linear chain to collectively process requests from the management service by aggregating data using interconnections between the plurality of managed endpoint devices;
   receiving endpoint data for an unmanageable endpoint device, the unmanageable endpoint device incapable of directly participating in the management protocol;
   receiving, from the linear chain, a linear chain request via the management protocol for the unmanageable endpoint device;
   determining a response to the linear chain request using the endpoint data; and
   sending, to the linear chain, via the management protocol, the response using a virtual representation of the unmanageable endpoint device, wherein using the virtual representation comprises mimicking participation by the unmanageable endpoint device in the linear chain.

13. The method of claim 12, wherein establishing the connection with the management service comprises indicating a first network address to receive management service requests and indicating a second network address from which to transmit management service responses.

14. The method of claim 13, wherein the first network address is associated with a first virtual representation of a first unmanageable endpoint device and the second network address is associated with a second virtual representation of a second unmanageable endpoint device, wherein a plurality of network addresses with numerical values between the first network address and the second network addresses are associated with a corresponding plurality of virtual representations of unmanageable endpoint devices.

15. The method of claim 14, wherein a virtual linear chain of unmanageable endpoint devices is formed with the first virtual representation, the corresponding plurality of virtual representations, and the second virtual representation, the first virtual representation configured as a front-end endpoint of the virtual linear chain configured to receive requests from the management service and the second virtual representation configured as a back-end endpoint of the virtual linear chain configured to transmit responses to the management service, the responses containing data aggregated from the first virtual representation, the corresponding plurality of virtual representations, and the second virtual representation.

16. The method of claim 12, wherein receiving the endpoint data comprises requesting particular types of endpoint data based on requests received from the management service, the particular types of endpoint data requested directly from the unmanageable endpoint device and/or from an external data store containing the particular types of endpoint data or portions thereof.

17. The method of claim 12, wherein a data structure comprising a plurality of entries is to provide virtual representations of a plurality of unmanageable endpoint devices including the virtual representation of the unmanageable endpoint device, each entry configurable to store at least a portion of the endpoint data associated with a corresponding unmanageable endpoint, the entry to be accessed to provide the corresponding virtual representation.

18. The method of claim 17, wherein the data structure comprises a table and the entries comprise rows of the table.

19. The method of claim 17 further comprising:
    searching the data structure to locate an entry associated with a first unmanageable endpoint device responsive to a management service request for a first set of data associated with the first unmanageable endpoint device,
    reading the first set of data from the entry,
    generating a response message including the first set of data, and
    transmitting the response message to the management service.

20. The method of claim 12 further comprising:
    storing the endpoint data for the unmanageable endpoint device in a local data store; and
    querying the local data store to access the endpoint data, or portions thereof, in response to requests from the management service.

21. The method of claim 12, wherein a virtual machine is to provide the virtual representation of the unmanageable endpoint device.

22. The method of claim 12, wherein the virtual representation of the unmanageable endpoint device comprises a virtual machine configured as a proxy for the unmanageable endpoint device.

* * * * *